(12) United States Patent
Carroll

(10) Patent No.: US 9,635,332 B2
(45) Date of Patent: Apr. 25, 2017

(54) SATURATED PIXEL RECOVERY IN LIGHT-FIELD IMAGES

(71) Applicant: Lytro, Inc., Mountain View, CA (US)

(72) Inventor: Robert Carroll, San Francisco, CA (US)

(73) Assignee: Lytro, Inc., Mountain View, CA (US)

( * ) Notice: Subject to any disclaimer, the term of this patent is extended or adjusted under 35 U.S.C. 154(b) by 384 days.

(21) Appl. No.: 14/480,340

(22) Filed: Sep. 8, 2014

(65) Prior Publication Data

US 2016/0073076 A1   Mar. 10, 2016

(51) Int. Cl.
| | |
|---|---|
| *G06K 9/40* | (2006.01) |
| *H04N 9/73* | (2006.01) |
| *H04N 5/217* | (2011.01) |
| *H04N 5/232* | (2006.01) |
| *H04N 9/04* | (2006.01) |

(Continued)

(52) U.S. Cl.
CPC ............. *H04N 9/735* (2013.01); *H04N 5/217* (2013.01); *H04N 5/23293* (2013.01); *H04N 5/359* (2013.01); *H04N 5/3572* (2013.01); *H04N 9/04* (2013.01); *H04N 9/045* (2013.01); *G06T 2207/10052* (2013.01)

(58) Field of Classification Search
CPC .... H04N 5/23293; H04N 5/217; H04N 9/045; H04N 9/735; H04N 9/64; H04N 9/73; H04N 9/04
USPC .......................................................... 382/275
See application file for complete search history.

(56) References Cited

U.S. PATENT DOCUMENTS

| 4,661,986 A | 4/1987 | Adelson |
|---|---|---|
| 5,076,687 A | 12/1991 | Adelson |

(Continued)

FOREIGN PATENT DOCUMENTS

| WO | 2006039486 | 4/2006 |
|---|---|---|
| WO | 2007092545 | 8/2007 |
| WO | 2007092581 | 8/2007 |

OTHER PUBLICATIONS

Chen, W., et al., "Light field mapping: Efficient representation and hardware rendering of surface light fields". ACM Transactions on Graphics 21, 3, 447-456, 2002.

(Continued)

*Primary Examiner* — Ali Bayat
(74) *Attorney, Agent, or Firm* — Raubvogel Law Office

(57) ABSTRACT

According to various embodiments, the system and method disclosed herein process light-field image data so as to mitigate or remove the effects of pixel saturation in light-field images. A light-field image may be captured with a light-field image capture device with a microlens array. The light-field image may be demodulated, and then a recovered value for each saturated pixel of the demodulated light-field image may be obtained. This may be done by comparing a saturated value of each saturated pixel with reference values of reference pixels proximate the saturated pixel and, if the proximate pixels have a higher reference value than the saturated value, setting the saturated pixel to the reference value. This process may be carried out iteratively until recovered values are obtained for the saturated pixels. A demodulated, saturation-recovered light-field image may then be generated and displayed with the recovered values for the saturated pixels.

25 Claims, 24 Drawing Sheets

(51) Int. Cl.
*H04N 5/357* (2011.01)
*H04N 5/359* (2011.01)

(56) References Cited

U.S. PATENT DOCUMENTS

| | | | |
|---|---|---|---|
| 5,818,525 A * | 10/1998 | Elabd | H04N 9/045 348/268 |
| 5,949,433 A | 9/1999 | Klotz | |
| 6,075,889 A * | 6/2000 | Hamilton, Jr. | G06T 3/4007 348/E9.01 |
| 6,529,265 B1 | 3/2003 | Henningsen | |
| 7,329,856 B2 | 2/2008 | Ma et al. | |
| 7,477,304 B2 | 1/2009 | Hu | |
| 7,620,309 B2 | 11/2009 | Georgiev | |
| 7,623,726 B1 | 11/2009 | Georgiev | |
| 7,683,951 B2 | 3/2010 | Aotsuka | |
| 7,936,392 B2 | 5/2011 | Ng et al. | |
| 7,949,252 B1 | 5/2011 | Georgiev | |
| 8,289,440 B2 | 10/2012 | Knight et al. | |
| 8,290,358 B1 | 10/2012 | Georgiev | |
| 8,400,533 B1 * | 3/2013 | Szedo | H04N 9/646 348/222.1 |
| 8,581,998 B2 | 11/2013 | Ohno | |
| 8,724,014 B2 | 5/2014 | Ng et al. | |
| 8,948,545 B2 | 2/2015 | Akeley et al. | |
| 8,971,625 B2 | 3/2015 | Pitts et al. | |
| 9,013,611 B1 * | 4/2015 | Szedo | G06T 3/4015 348/242 |
| 9,210,391 B1 * | 12/2015 | Mills | H04N 9/07 |
| 2005/0080602 A1 | 4/2005 | Snyder et al. | |
| 2007/0071316 A1 | 3/2007 | Kubo | |
| 2007/0230944 A1 | 10/2007 | Georgiev | |
| 2007/0252074 A1 | 11/2007 | Ng et al. | |
| 2008/0018668 A1 | 1/2008 | Yamauchi | |
| 2008/0152215 A1 | 6/2008 | Horie et al. | |
| 2008/0180792 A1 | 7/2008 | Georgiev | |
| 2008/0193026 A1 | 8/2008 | Horie et al. | |
| 2008/0253652 A1 * | 10/2008 | Gupta | G06T 3/4015 382/167 |
| 2008/0277566 A1 | 11/2008 | Utagawa | |
| 2008/0309813 A1 | 12/2008 | Watanabe | |
| 2009/0027542 A1 | 1/2009 | Yamamoto et al. | |
| 2009/0041381 A1 | 2/2009 | Georgiev et al. | |
| 2009/0041448 A1 | 2/2009 | Georgiev et al. | |
| 2009/0102956 A1 | 4/2009 | Georgiev | |
| 2009/0128658 A1 | 5/2009 | Hayasaka et al. | |
| 2009/0128669 A1 | 5/2009 | Ng et al. | |
| 2009/0140131 A1 | 6/2009 | Utagawa | |
| 2009/0185801 A1 | 7/2009 | Georgiev et al. | |
| 2009/0190022 A1 | 7/2009 | Ichimura | |
| 2009/0190024 A1 | 7/2009 | Hayasaka et al. | |
| 2009/0273843 A1 | 11/2009 | Raskar et al. | |
| 2009/0295829 A1 | 12/2009 | Georgiev et al. | |
| 2010/0026852 A1 | 2/2010 | Ng et al. | |
| 2010/0141802 A1 | 6/2010 | Knight et al. | |
| 2010/0277629 A1 | 11/2010 | Tanaka | |
| 2011/0129165 A1 | 6/2011 | Lim et al. | |
| 2012/0050562 A1 | 3/2012 | Perwass et al. | |
| 2012/0057040 A1 | 3/2012 | Park et al. | |
| 2012/0327222 A1 | 12/2012 | Ng et al. | |
| 2013/0113981 A1 | 5/2013 | Knight et al. | |
| 2013/0128081 A1 | 5/2013 | Georgiev et al. | |
| 2013/0321677 A1 * | 12/2013 | Cote | H04N 5/217 348/243 |
| 2014/0184885 A1 | 7/2014 | Tanaka et al. | |
| 2015/0029386 A1 | 1/2015 | Pitts et al. | |

OTHER PUBLICATIONS

Debevec, P., et al., "Recovering high dynamic range radiance maps from photographs", SIGGRAPH 1997, 369-378.
Debevec, P., et al., "Acquiring the reflectance field of a human face", SIGGRAPH 2000.
Dorsey, J., et al., "Design and simulation of opera lighting and projection effects", In Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Fattal, Raanan, et al., "Gradient Domain High Dynamic Range Compression", ACM SIGGRAPH 2002.
Georgiev, T., et al., Plenoptic Camera 2.0 (2008).
Georgiev, T., et al., "Unified Frequency Domain Analysis of Lightfield Cameras" (2008).
Georgiev, T., et al., "Spatio-Angular Resolution Tradeoff in Integral Photography," Proceedings of Eurographics Symposium on Rendering, 2006.
"GradientShop: A Gradient-Domain Optimization Framework for Image and Video Filtering", SIGGRAPH 2010.
Orzan, Alexandrina, et al., "Diffusion Curves: A Vector Representation for Smooth-Shaded Images", ACM Transactions on Graphics—Proceedings of SIGGRAPH 2008, vol. 27—2008.
Perez, Patrick, et al., "Poisson Image Editing", ACM Transactions on Graphics—Proceedings of ACM SIGGRAPH 2003, vol. 22, Issue 3, Jul. 2003, pp. 313-318.

* cited by examiner

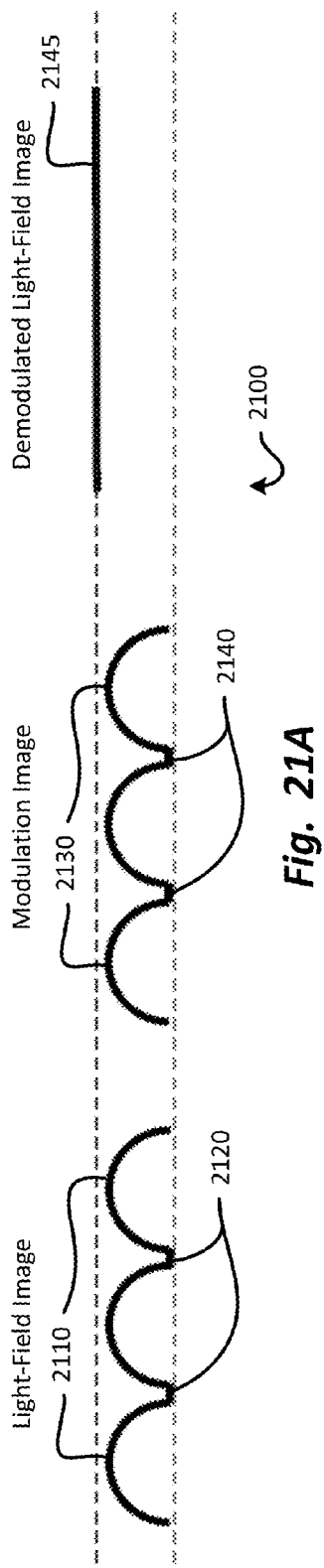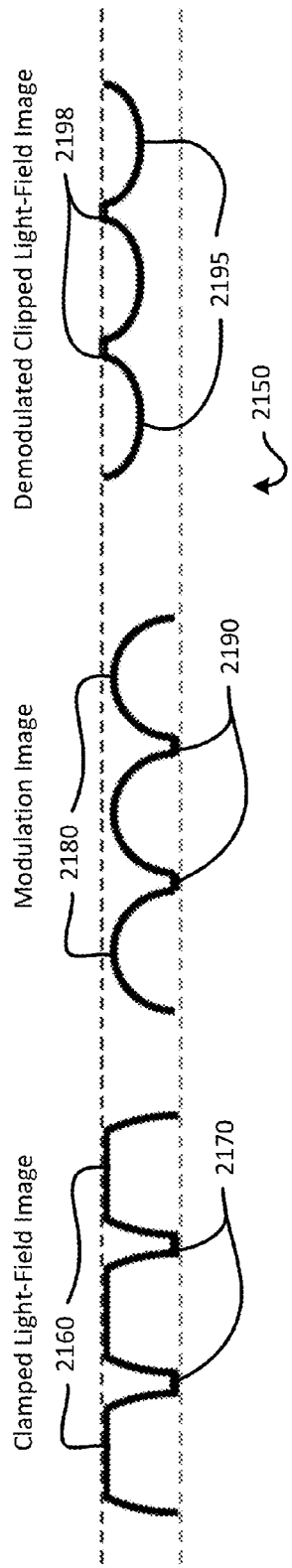

SATURATED PIXEL RECOVERY IN LIGHT-FIELD IMAGES

CROSS-REFERENCE TO RELATED APPLICATIONS

The present application is related to U.S. application Ser. No. 13/774,925 for "Compensating for Sensor Saturation and Microlens Modulation During Light-Field Image Processing", filed Feb. 22, 2013, the disclosure of which is incorporated herein by reference in its entirety.

The present application is related to U.S. Utility application Ser. No. 13/688,026 for "Compensating for Variation in Microlens Position During Light-Field Image Processing", filed on Nov. 28, 2012, the disclosure of which is incorporated herein by reference in its entirety.

The present application is related to U.S. Utility application Ser. No. 11/948,901 for "Interactive Refocusing of Electronic Images," filed Nov. 30, 2007, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same," filed Feb. 10, 2010, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011, the disclosure of which is incorporated herein by reference in its entirety.

The present application is related to U.S. Utility application Ser. No. 13/155,882 for "Storage and Transmission of Pictures Including Multiple Frames," filed Jun. 8, 2011, the disclosure of which is incorporated herein by reference in its entirety.

The present application is related to U.S. Utility application Ser. No. 13/664,938 for "Light-field Camera Image, File and Configuration Data, and Method of Using, Storing and Communicating Same," filed Oct. 31, 2012, the disclosure of which is incorporated herein by reference in its entirety.

The present application is related to U.S. Utility application Ser. No. 13/774,971 for "Compensating for Variation in Microlens Position During Light-Field Image Processing," filed Feb. 22, 2013, the disclosure of which is incorporated herein by reference in its entirety.

The present application is related to U.S. Utility application Ser. No. 13/774,986 for "Light-Field Processing and Analysis, Camera Control, and User Interfaces and Interaction on Light-Field Capture Devices," filed Feb. 22, 2013, the disclosure of which is incorporated herein by reference in its entirety.

TECHNICAL FIELD

The present disclosure relates to systems and methods for processing and displaying light-field image data, and more specifically, to systems and methods for compensating for pixel saturation in light-field images.

SUMMARY

According to various embodiments, the system and method of the technology described herein process light-field image data so as to reduce color artifacts, reduce projection artifacts, and/or increase dynamic range. These techniques operate, for example, on image data affected by sensor saturation and/or microlens modulation. A flat-field image may be captured and converted to a modulation image, and then applied on a per-pixel basis, according to techniques described herein, to generate a demodulated light-field image.

Then, a recovered value for each saturated pixel of the demodulated light-field image may be obtained. This may be done by a diffusion process, where values of saturated pixels in the demodulated light-field image are iteratively interpolated from their 2D spatial neighbors. A saturated value of each saturated pixel is compared with reference values of reference pixels proximate the saturated pixel. According to some examples, the values of four reference pixels adjacent to the saturated pixel may be averaged together. If the average value of the reference pixels is higher than the saturated value, the value of the saturated pixel may be set to the average value of the reference pixels.

This process may be carried out iteratively for each saturated pixel until convergence occurs, i.e., little or no further increase in value occurs for each saturated pixel. Thus, recovered values may be obtained for all saturated pixels. A demodulated, saturation-recovered light-field image may then be generated and displayed with the recovered values for the saturated pixels.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 21A and 21B are graphs depicting the effects of modulation on an unsaturated light-field image and a saturated light-field image, respectively.

DEFINITIONS

Figure 1:
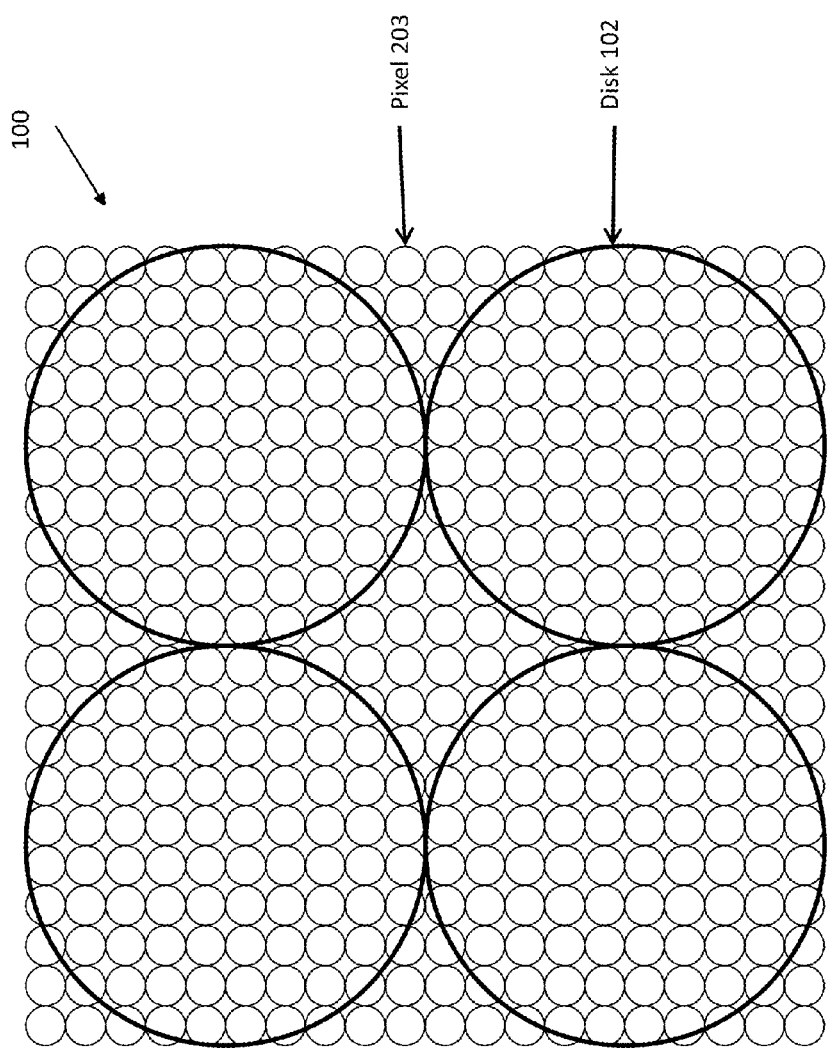
FIG. 1 depicts a portion of a light-field image.

For purposes of the description provided herein, the following definitions are used:

aggregated irradiance: total irradiance over a period of time, e.g., on a sensor pixel while the shutter is open.

automatic white balance (AWB): the process of computing white-balance (WB) factors and estimating color of a scene's illumination.

Bayer pattern: a particular 2×2 pattern of different color filters above pixels on a digital sensor. The filter pattern is 50% green, 25% red and 25% blue.

clamp: in the context of the present disclosure, to "clamp a signal to a value" means to select the smaller of the signal value and the clamp value.

chrominance: a mapping of color channel values to a lower (typically n−1) space.

demosaicing: a process of computing and assigning values for all captured color channels to each pixel, in particular when that pixel initially includes a value for only one color channel.

disk: a region in a light-field image that is illuminated by light passing through a single microlens; may be circular or any other suitable shape.

exposure value (EV): a measure of net sensor sensitivity resulting from ISO, shutter speed, and f-stop.

flat-field image: a light-field image of a scene with undifferentiated rays.

flat-field response contour: a continuous plot of the value that a hypothetical sensor pixel would take if centered at various locations on the surface of a sensor.

image: a two-dimensional array of pixel values, or pixels, each specifying a color.

ISO: a measure of the gain of a digital sensor.

light-field image: an image that contains a representation of light field data captured at the sensor.

luminance: a one-component reduction of color that corresponds to perceived brightness or intensity.

microlens: a small lens, typically one in an array of similar microlenses.

modulation image: an image that is computed from a flat-field image by normalizing based on average values (per color channel).

normalized pixel value: a sensor pixel value that has been adjusted to a range where 0.0 corresponds to black (no light) and 1.0 corresponds to saturation.

quantization: a process of approximating a continuous value with one of a fixed set of pre-determined values. Quantization error increases as the separations between pre-determined values increases.

saturated pixel: a pixel that has been driven by aggregated irradiance to its maximum representation.

sensor saturation: a sensor that has one or more saturated pixels vignetting: a phenomenon, related to modulation, in which an image's brightness or saturation is reduced at the periphery as compared to the image center.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 16A:
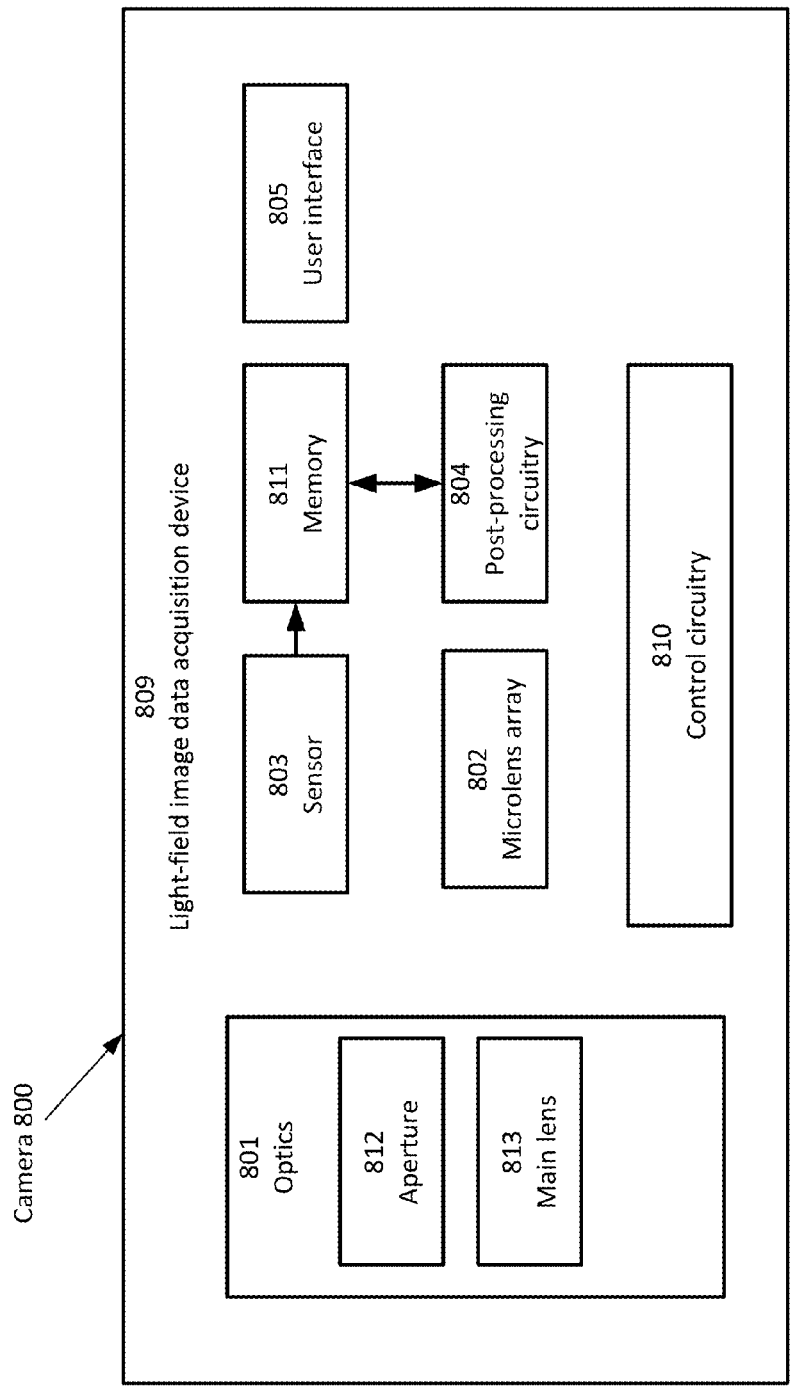
FIG. 16A depicts an example of an architecture for implementing the methods of the present disclosure in a light-field capture device, according to one embodiment.
Figure 16B:
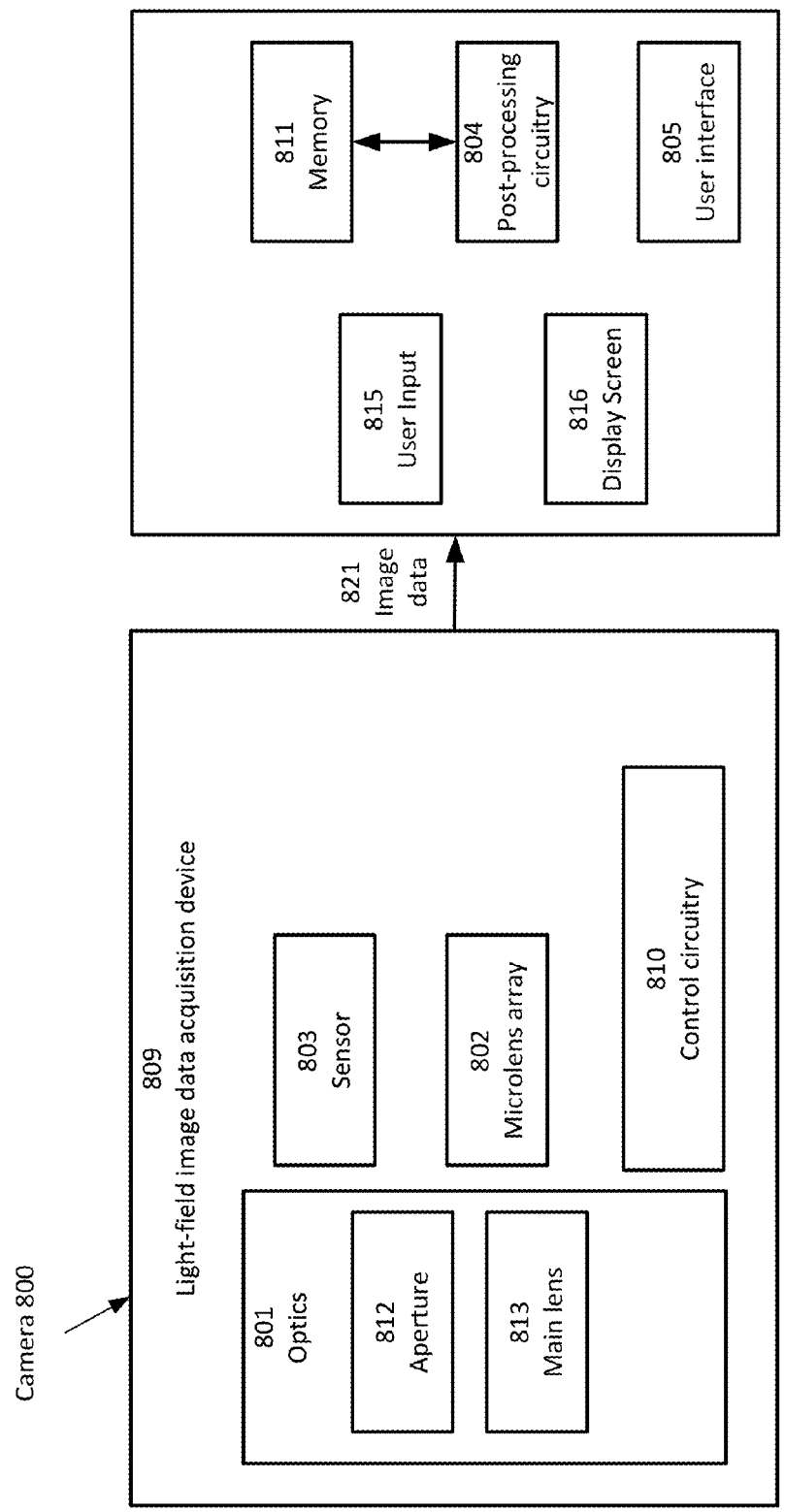
FIG. 16B depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 16A, there is shown a block diagram depicting an architecture for implementing the method of the present disclosure in a light-field capture device such as a camera 800. Referring now also to FIG. 16B, there is shown a block diagram depicting an architecture for implementing the method of the present disclosure in a post-processing system communicatively coupled to a light-field capture device such as a camera 800, according to one embodiment. One skilled in the art will recognize that the particular configurations shown in FIGS. 16A and 16B are merely exemplary, and that other architectures are possible for camera 800. One skilled in the art will further recognize that several of the components shown in the configurations of FIGS. 16A and 16B are optional, and may be omitted or reconfigured.

Figure 17:
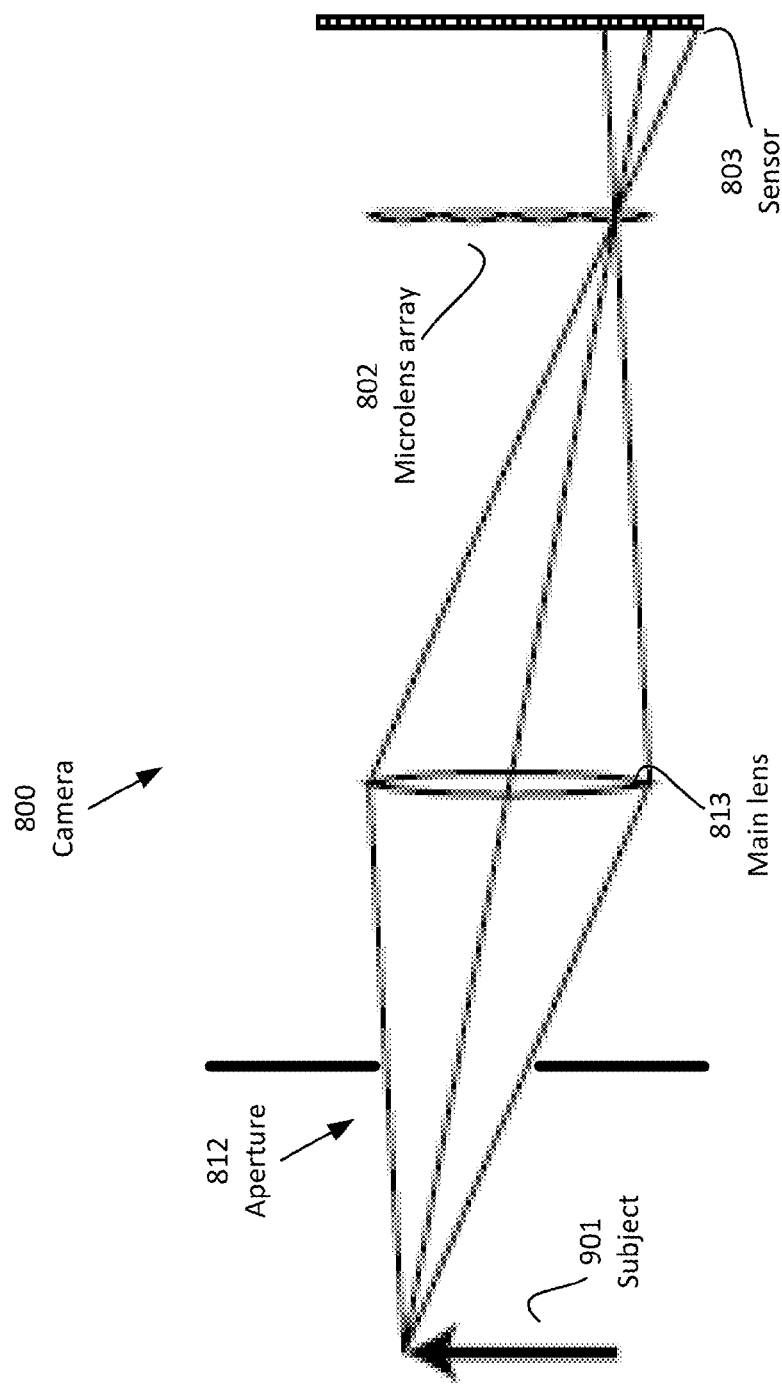
FIG. 17 depicts an example of an architecture for a light-field camera for implementing the methods of the present disclosure according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 17, there is shown an example of an architecture for a light-field camera 800 for implementing the method of the present disclosure according to one embodiment. The Figure is not shown to scale. FIG. 17 shows, in conceptual form, the relationship between aperture 812, main lens 813, microlens array 802, and sensor 803, as such components interact to capture light-field data for subject 901.

In at least one embodiment, light-field camera 800 may also include a user interface 805 for allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703,367 for "Light-field Camera Image, File and Configuration Data, and Method of Using, Storing and Communicating Same," filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 16A, or it may be in a separate component external to light-field image data acquisition device 809, as shown in FIG. 16B. Such separate component may be local or remote with respect to light-field image data acquisition device 809. Any suitable wired or wireless protocol can be used for transmitting image data 821 to circuitry 804; for example camera 800 can transmit image data 821 and/or other data via the Internet, a cellular data network, a WiFi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 815 and/or a display screen 816. If desired, light-field image data may be displayed for the user on the display screen 816.

Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 203; for illustrative purposes, each disk 102 is ten pixels 203 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Sensor Saturation

As described above, digital sensor 803 in light-field image data acquisition device 809 may capture an image as a two-dimensional array of pixel values. Each pixel 203 may report its value as an n-bit integer, corresponding to the aggregated irradiance incident on that pixel 203 during its exposure to light. Typical pixel representations are 8, 10, or 12 bits per pixel, corresponding to 256, 1024, or 4096 equally spaced aggregated irradiances. In some devices 809, the sensitivity of sensor 803 may be adjusted, but, in general, such adjustment affects all pixels 203 equally. Thus, for a given sensitivity, sensor 803 may capture images whose aggregated irradiances vary between zero and the aggregated irradiance that drives a pixel 203 to its maximum integer representation. Aggregated irradiances greater than this value may also drive the pixel 203 upon which they are incident to its maximum representation, so these irradiances may not be distinguishable in subsequent processing of the captured image. Such a pixel 203 is referred to herein as being saturated. Sensor saturation refers to a condition in which sensor 803 has one or more saturated pixels 203.

It is well known to provide capability, within an image capture device such as a digital camera, to adjust the sensitivity (ISO value) of digital sensor 803, the duration of its exposure to light captured by main lens 813 (shutter speed), and/or the size of aperture 812 (f-stop) to best capture the information in the scene. The net sensitivity resulting from ISO, shutter speed, and f-stop is referred to as exposure value, or EV. If EV is too low, information may be lost due to quantization, because the range of aggregated irradiances uses only a small portion of the available pixel representations. If EV is too high, information may be lost due to saturation, because pixels 203 with high aggregated irradiances have values that are indistinguishable from one another. While an EV that avoids sensor saturation is appropriate for some images, many images are best sampled with an EV that results in some saturated pixels 203. For example, a scene for which most aggregated pixel irradiances fall in a small range, but a few pixels 203 experience much greater aggregated irradiances, is best sampled with an EV that allows the high-aggregated-irradiance pixels 203 to be saturated. If EV were adjusted such that no pixel 203 saturated, the scene would be highly quantized. Thus, in some lighting conditions, sensor saturation may not be avoided without significant compromise.

As described above, digital sensors 803 may represent pixel values with differing numbers of bits. Pixel values may be normalized such that integer value zero corresponds to real value 0.0, and integer value $2^n-1$ (the maximum pixel value for a pixel represented with n bits) corresponds to real value 1.0. For purposes of the description provided herein, other factors such as black-level offset, noise other than that due to quantization, and pixels that do not operate correctly may be ignored.

Bayer Pattern

Ideally a digital sensor 803 would capture full chromatic information describing the aggregated irradiance at each pixel 203. In practice, however, each pixel 203 often captures a single value indicating the aggregate irradiance across a specific range of spectral frequencies. This range may be determined, for example, by a spectral filter on the surface of digital sensor 803, which restricts the range of light frequencies that is passed through to the pixel sensor mechanism. Because humans may distinguish only three ranges of spectra, in at least one embodiment, sensor 803 is configured so that each pixel 203 has one of three spectral filters, thus capturing information corresponding to three spectral ranges. These filters may be arranged in a regular pattern on the surface of digital sensor 803.

Figure 2:
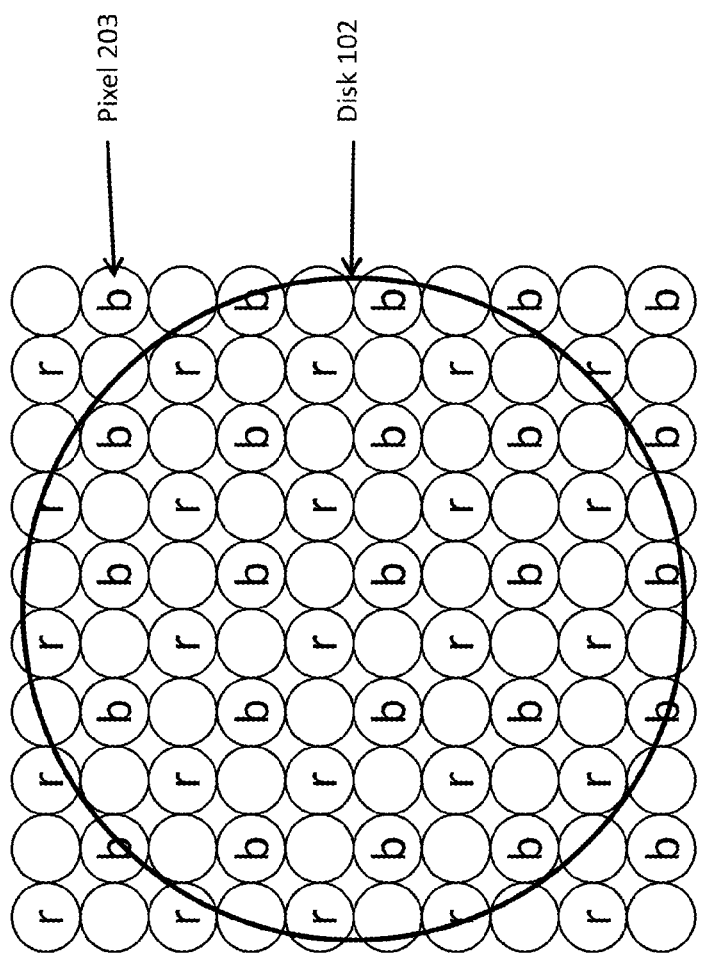
FIG. 2 depicts an example of a Bayer pattern.

Referring now to FIG. 2, there is shown one possible arrangement of filters for pixels 203, referred to as a Bayer pattern. FIG. 2 depicts a number of pixels 203 associated with a single disk 102, configured in a Bayer pattern. Pixels 203 sensitive to low spectral frequencies are marked "r", corresponding to the perceived color red. Pixels 203 sensitive to high spectral frequencies are marked "b", corresponding to the perceived color blue. The remaining (unmarked) pixels 203 are sensitive to mid-spectral frequencies, corresponding to the perceived color green. For purposes of the description herein, these spectral ranges are referred to as color channels.

In alternative embodiments, other color filters can be represented, such as those that include additional primary colors. In various embodiments, the system of the present disclosure can also be used in connection with multi-spectral systems.

In alternative embodiments, the filters can be integrated into microlens array 802 itself.

Modulation

Figure 3:
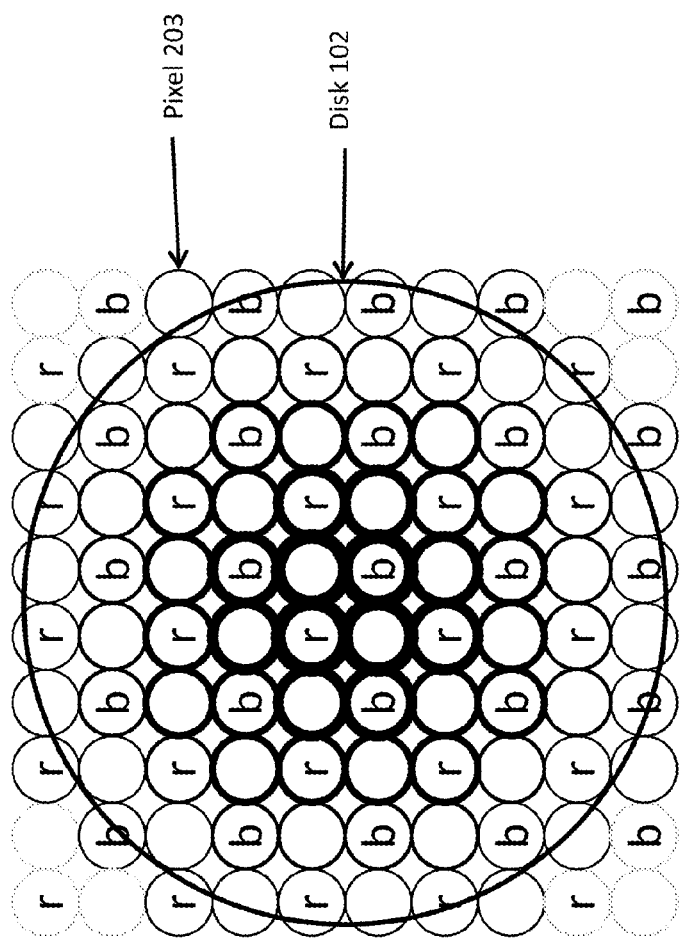
FIG. 3 depicts an example of flat-field modulation, shown as a distribution of irradiances of pixels within a single disk illuminated by a scene with uniform radiance.

Pixels 203 within a disk 102 may not experience equal irradiance, even when the scene being imaged has uniform radiance (i.e., radiance that is the same in all directions and at all spatial locations). For example, pixels 203 located near the center of a disk 102 may experience greater irradiance, and pixels near or at the edge of the disk 102 may experience lower irradiance. In some situations, the ratio of the greatest pixel irradiance to the lowest pixel irradiance may be large, for example, 100:1. Referring now to FIG. 3, there is shown an example of a distribution of irradiances of pixels 203 within a single disk 102 projected by a microlens in microlens array 802, illuminated by a scene with uniform radiance. In this Figure, irradiance is represented by the thickness of each pixel's 203 circular representation: thick circles in the center denoting pixels 203 with high irradiance, and increasingly thin circles toward the edge of disk 102 denoting pixels 203 with reduced irradiance. This distribution of irradiances for a scene with uniform radiance is referred to as a "flat-field modulation".

Vignetting is a related phenomenon, in which an image's brightness or saturation is reduced at the periphery as compared to the image center.

Figure 4:
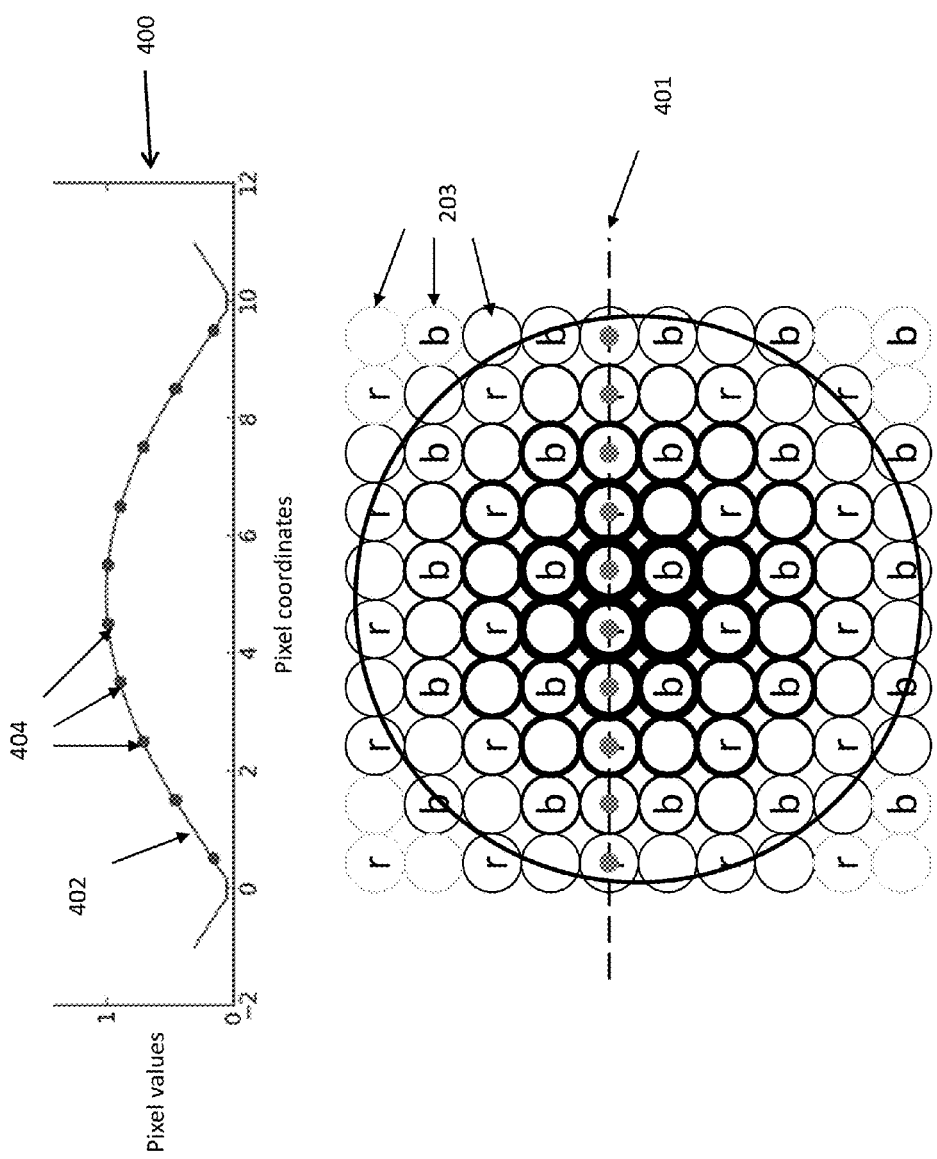
FIG. 4 is a graph depicting an example of a flat-field response contour based on the flat-field modulation depicted in FIG. 3.

As depicted in FIG. 3, microlens modulation is a two-dimensional phenomenon. For illustrative and analytical purposes, however, it can be useful to consider a one-dimensional contour displaying the effect of modulation. Referring now to FIG. 4, there is shown a graph 400 depicting an example of a flat-field response contour 402 based on the flat-field modulation depicted in FIG. 3.

In graph 400, ten discrete values 404 are plotted, corresponding to normalized pixel values along a contour segment 401 drawn horizontally through the (approximate) center of disk 102. Although these ten values 404 are discrete, a continuous flat-field contour 402 is also plotted. Contour 402 describes the values pixels 203 would have if their centers were located at each position along the x-axis.

Figure 5:
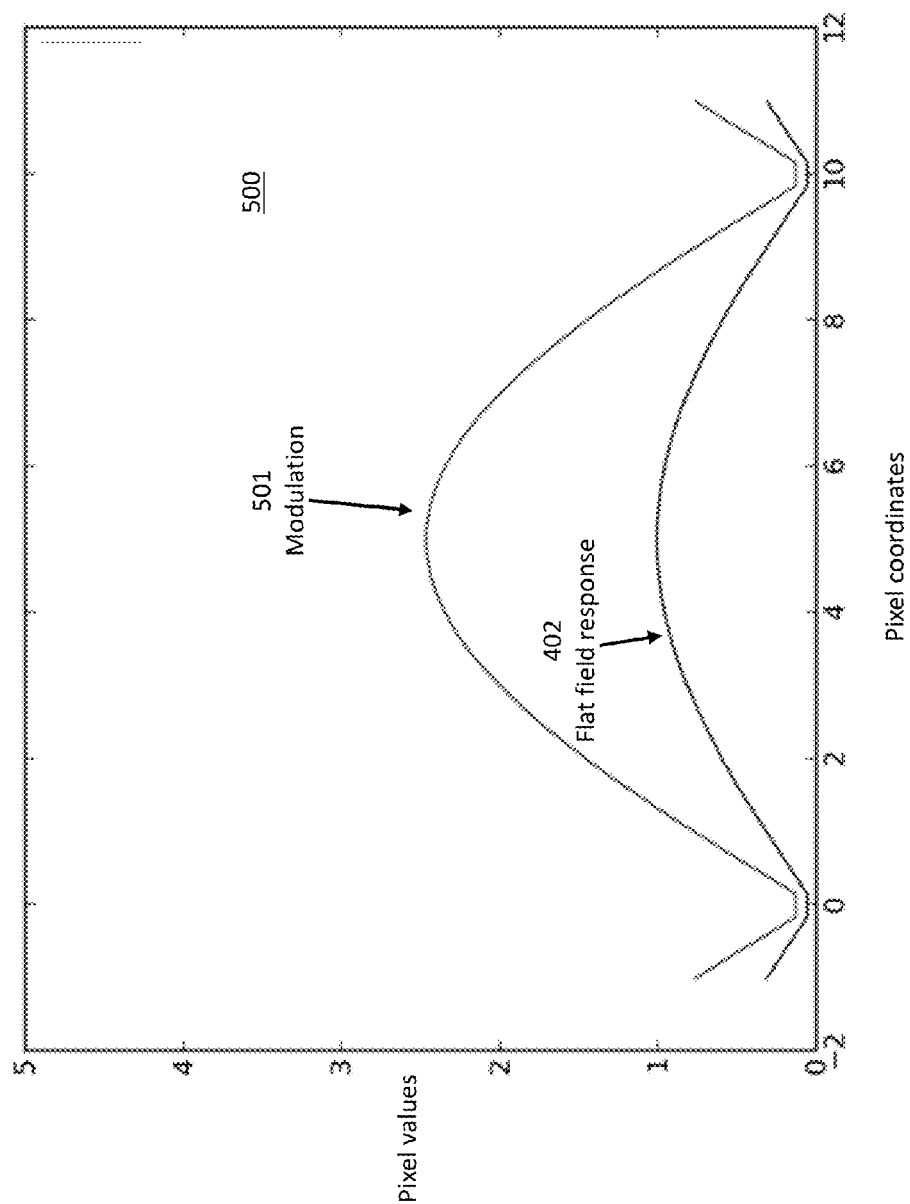
FIG. 5 is a graph depicting an example of a modulation contour corresponding to the flat-field response contour depicted in FIG. 4.

It may be a good approximation to predict that all of the light that is incident on microlens array 802 also reaches digital sensor 803—assuming that microlens array 802 may refract light, but does not occlude light. Referring now to FIG. 5, there is shown a graph 500 depicting an example of a modulation contour 501 corresponding to the flat-field response contour 402 depicted in FIG. 4. Modulation contour 501 is computed by scaling flat-field response contour 402 such that its average value is 1.0. To be physically accurate, the average flat-field value may be computed over the two-dimensional disk area, rather than the one-dimensional contour. Thus computed, modulation contour 501 is a physically accurate scale factor that specifies the ratio of actual irradiance at a pixel 203, to the irradiance that the pixel 203 would receive if the same total irradiance were equally distributed across the pixels 203 on the sensor's 803 surface.

A modulation image, having pixel values that are the modulation values corresponding to each pixel 203 in a light-field image, may be computed by imaging a scene with uniform radiance. To ensure numerically accurate results, EV and scene radiance may be adjusted so that pixels with maximum irradiance have normalized values near 0.5. Such a light-field image is referred to herein as a flat-field image. The average pixel value of this flat-field image may be computed. The modulation value for each pixel in the modulation image may then be computed as the value of the corresponding pixel in the flat-field image, divided by the average pixel value of the flat-field image.

Bayer Consequences

As described above, digital sensor 803 may include pixels 203 with different spectral filters, which are sensitive to different ranges of visible spectra. These pixels 203 may be arranged in a regular pattern, such as the Bayer pattern described above in connection with FIG. 2. In one embodiment, modulation values for pixels 203 of different spectral sensitivities may be computed separately. For example, if each pixel 203 has one of three spectral sensitivities—red, green, or blue—then modulation values may be computed separately for all the red pixels 203, for all the green pixels 203, and for all the blue pixels 203. For each calculation, the average flat-field value of all the pixels 203 in the group is computed, and then each pixel's 203 modulation value is computed as its flat-field value divided by the average flat-field value.

Sampling and Interpolation

Modulation may differ as a function of several parameters of light-field camera 800. For example, modulation may differ as the focal length and focus distance of main lens 813 are changed, and as the exposure duration of a mechanical shutter is changed. In some embodiments, it may be impractical to compute and retain a modulation image for each possible combination of such parameters.

For example, there may be n camera parameters that affect modulation. These n parameters may be thought of as defining an n-dimensional space. This space may be sampled at points (n-tuples) that are distributed throughout the space. Each sample may be taken by 1) setting camera parameters to the values specified by the sample coordinates, and 2) capturing a flat-field image. All camera parameters other than the n parameters, and all consequential external variables (for example, the scene radiance) may retain the same values during the entire sampling operation. The sample locations may be selected so that there is minimal difference between the values in corresponding pixels 203 of flat-field images that are adjacent in the n-dimensional space. Under these circumstances, the flat-field image for a point in the n-dimensional space for which no sample was computed may be computed by interpolating or extrapolating from samples in the n-dimensional space. Such an interpolation or extrapolation may be computed separately for each pixel 203 in the flat-field image. After the flat-field image for the desired coordinate in the n-dimensional space has been computed, the modulation image for this coordinate may be computed from the flat-field image as described above.

Storage

Flat-field images may be captured during the manufacture and calibration of camera 800, or at any time thereafter. They may be stored by any digital means, including as files in custom formats or any standard digital-image format, or in a data base (not shown). Data storage size may be reduced using compression, either lossless (sufficient for an exact reconstruction of the original data) or lossy (sufficient for a close but not exact reconstruction of the original data.) Flat-field data may be stored locally or remotely. Examples of such storage locations include, without limitation: on camera 800; in a personal computer, mobile device, or any other personal computation appliance; in Internet storage; in a data archive; or at any other suitable location.

Demodulation

It may be useful to eliminate the effects of modulation on a light-field image before processing the pixels 203 in that image. For example, it may be useful to compute a ratio between the values of two pixels 203 that are near each other. Such a ratio is meaningless if the pixels 203 are modulated differently from one another, but it becomes meaningful after the effects of modulation are eliminated. The process of removing the effects of modulation on a light-field image is referred to herein as a demodulation process, or as demodulation.

According to various embodiments, flat-field images are captured and converted to modulation images, then applied on a per-pixel basis, according to techniques described herein.

The techniques described herein can be used to correct the effects of vignetting and/or modulation due to microlens arrays 802.

Each pixel in a modulation image describes the effect of modulation on a pixel in a light-field image as a simple factor m, where $$p_{mod} = m p_{ideal}$$

To eliminate the effect of modulation, $p_{mod}$ can be scaled by the reciprocal of m:

$$p_{demod} = \frac{1}{m} p_{mod} \cong p_{ideal}$$

Figure 6:
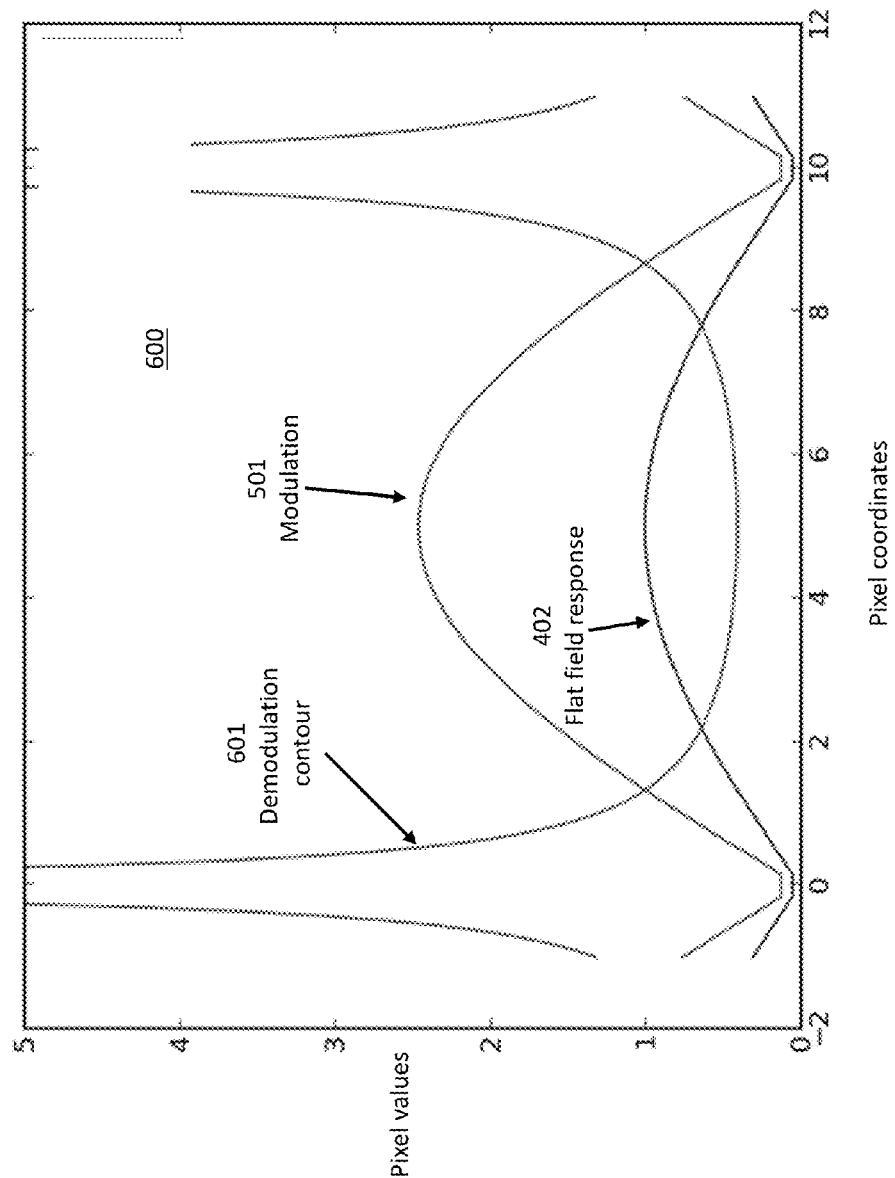
FIG. 6 is a graph depicting an example of a demodulation contour for the modulation contour depicted in FIG. 5.

Using this relationship, a demodulation image is computed as an image with the same dimensions as its corresponding modulation image, wherein each pixel has a value equal to the reciprocal of the value of the corresponding pixel in the modulation image. A light-field image is demodulated by multiplying it, pixel by pixel, with the demodulation image. Pixels in the resulting image have values that nearly approximate the values in an ideal (unmodulated) light-field image. Referring now to FIG. 6, there is shown an example of a demodulation contour 601 for the modulation contour 501 depicted in FIG. 5. A demodulation image corresponding to this demodulation contour 601 can be generated by taking the reciprocal of the pixel value at each point in the modulation image corresponding to modulation contour 501.

In some cases, noise sources other than quantization may cause a pixel 203 whose aggregate illumination is very low (such as a highly modulated pixel 203) to have a negative value. In at least one embodiment, when performing demodulation, the system disclosed herein clamps pixels in the computed modulation image to a very small positive value, so as to ensure that pixels in the demodulation image (the reciprocals of the modulation values) are never negative, and in fact never exceed a chosen maximum value (the reciprocal of the clamp value).

Demodulation can be used to correct for any type of optical modulation effect, and is not restricted to correcting for the effects of modulation resulting from the use of disks. For example, the techniques described herein can be used to correct modulation due to main-lens vignetting, and/or to correct modulation due to imperfections in microlens shape and position.

Demodulation can be performed at any suitable point (or points) in the image processing path of digital camera 800 or other image processing equipment. In some cases, such as when using a light field digital camera 800, existing hardware-accelerated operations (such as demosaicing) may operate more effectively if demodulation is performed earlier along the image processing path.

Demosaicing

In at least one embodiment, pixels 203 in the demodulated image may have single values, each corresponding to one of three spectral ranges: red, green, or blue. The red, green, and blue pixels may be arranged in a mosaic pattern, such as the Bayer pattern depicted in FIG. 2. Before further processing is done, it may be useful for each pixel 203 to have three values—red, green, and blue—so that it specifies the spectral intensity of incident light as completely as is possible in a tri-valued imaging system. The process of estimating and assigning the two unknown values at each pixel location is referred to as demosaicing.

In other embodiments, any number of spectral ranges can be used; thus, the above example (in which three spectral ranges are used) is merely exemplary.

One demosaicing approach is to estimate unknown pixel values from known values that are spatially near the known value in the image. For these estimations to give meaningful results, the values they operate on must be commensurate, meaning that their proportions are meaningful. However, pixel values in a modulated image are not commensurate—their proportions are not meaningful, because they have been scaled by different values. Thus demosaicing a modulated image (specifically, demosaicing a light-field image that has not been demodulated) may give unreliable results.

Because modulation in a light field camera can have higher amplitude and frequency (i.e. pixel modulation varies more dramatically than in a conventional camera), it can have a more significant effect on demosaicing than does vignetting in a conventional camera. Accordingly, the techniques of the present disclosure are particularly effective in connection with demosaicing efforts for light-field cameras.

Estimation of the Color of Scene Illumination

The three color-channel values of a demosaiced pixel may be understood to specify two distinct properties: chrominance and luminance. In general, chrominance is a mapping from n-valued to (n−1)-valued tuples, while luminance is a mapping from n-valued tuples to single values. More particularly, where three color channel values are available, chrominance is a two-value mapping of the three color channel values into the perceptual properties of hue (chrominance angle) and saturation (chrominance magnitude); luminance is a single-valued reduction of the three pixel values. Perceptual properties such as apparent brightness are specified by this value. For example, luminance may be computed as a weighted sum of the red, green, and blue values. The weights may be, for example, 0.2126 (for red), 0.7152 (for green), and 0.0722 (for blue).

Many algorithms that map and reduce a three-channel RGB signal to separate chrominance and luminance signals are known in the art. For example, chrominance may be specified as the ratios of the RGB channels to one another. These ratios may be computed using any of the values as a base. For example, the ratios r/g and b/g may be used. Regardless of which value is used as the base, exactly (n−1) values (i.e. two values, if there are three color channel values) are required to completely specify pixel chrominance with such a representation.

The illumination in a scene may be approximated as having a single chrominance (ratio of spectral components) that varies in amplitude throughout the scene. For example, illumination that appears red has a higher ratio of low-frequency spectral components to mid- and high-frequency spectral components. Scaling all components equally changes the luminance of the illumination without changing the ratios of its spectral components (its color channels).

The apparent chrominance or color constancy of an object in a scene is determined by the interaction of the surface of the object with the light illuminating it. In a digital imaging system, the chrominance of scene illumination may be estimated from the apparent chrominance of objects in the scene, if the light-scattering properties of some objects in the scene are known or can be approximated. Algorithms that make such approximations and estimations are known in the art as Automatic White Balance (AWB) algorithms.

While the colors in a captured image may be correct, in the sense that they accurately represent the colors of light captured by the camera, in some cases an image having these colors may not look correct to an observer. Human observers maintain color constancy, which adjusts the appearance of colors based on the color of the illumination in the environment and relative spatial location of one patch of color to another. When a picture is viewed by a human observer in an environment with different illumination than was present when the picture was captured, the observer maintains the color constancy of the viewing conditions by adjusting the colors in the image using the color of the illumination of the viewing environment, instead of the illumination of the scene captured in the picture. As a result, the viewer may perceive the colors in the captured picture to be unnatural.

To avoid the perception of unnatural colors in captured images, AWB algorithms may compute white-balance factors, in addition to their estimate of illuminant color. For example, one factor can be used for each of red, green, and blue, although other arrangements such as 3×3 matrices are also possible. Such factors are used to white-balance the image by scaling each pixel's red, green, and blue components. White-balance factors may be computed such that achromatic objects in the scene (i.e., objects that reflect all visible light frequencies with equal efficiency) appear achromatic, or gray, in the final picture. In this case, the white-balance factors may be computed as the reciprocals of the red, green, and blue components of the estimated color of the scene illuminant. These factors may all be scaled by a single factor such that their application to a color component changes only its chrominance, leaving luminance unchanged. It may be more visually pleasing, however, to compute white-balance factors that push gray objects nearer to achromaticity, without actually reaching that goal. For example, a scene captured at sunset may look more natural with some yellow remaining, rather than being compensated such that gray objects become fully achromatic.

Because AWB algorithms operate on colors, and because colors may be reliably available from sensor image data only after those data have been demosaiced, it may be advantageous, in some embodiments, to perform AWB computation on demosaiced image data. Any suitable methodology for sampling the Bayer pattern may be used. In particular, the sampling used for AWB statistical analysis need not be of the same type as is used for demosaicing. It may further be advantageous, in some embodiments, for the AWB algorithm to sample the demosaiced image data only at, or near, disk centers. In some situations, sampling the demosaiced image in highly modulated locations, such as near the edges of disks, may result in less reliable AWB operation, due, for example, to greater quantization noise.

Figure 18B:
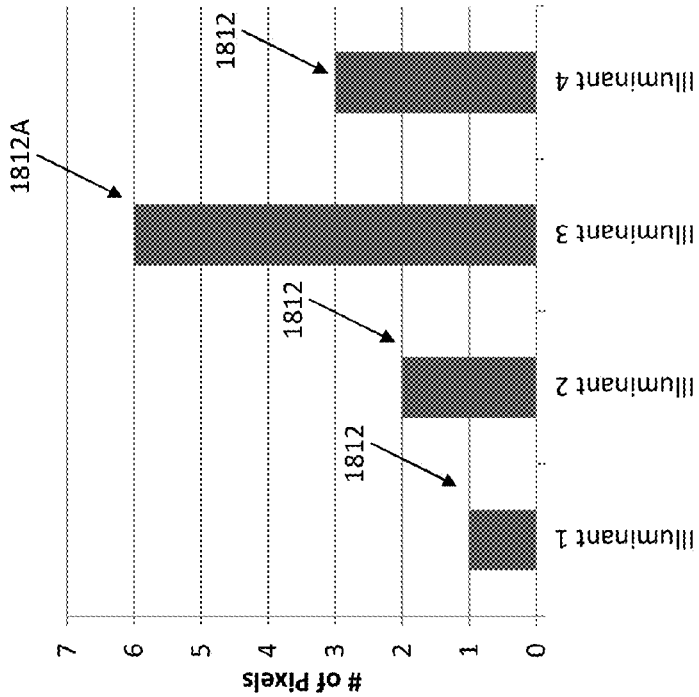
FIGS. 18A and 18B depict an example of a method for selecting an illuminant for a scene and its corresponding white balance factors, according to one embodiment.
Figure 18A:
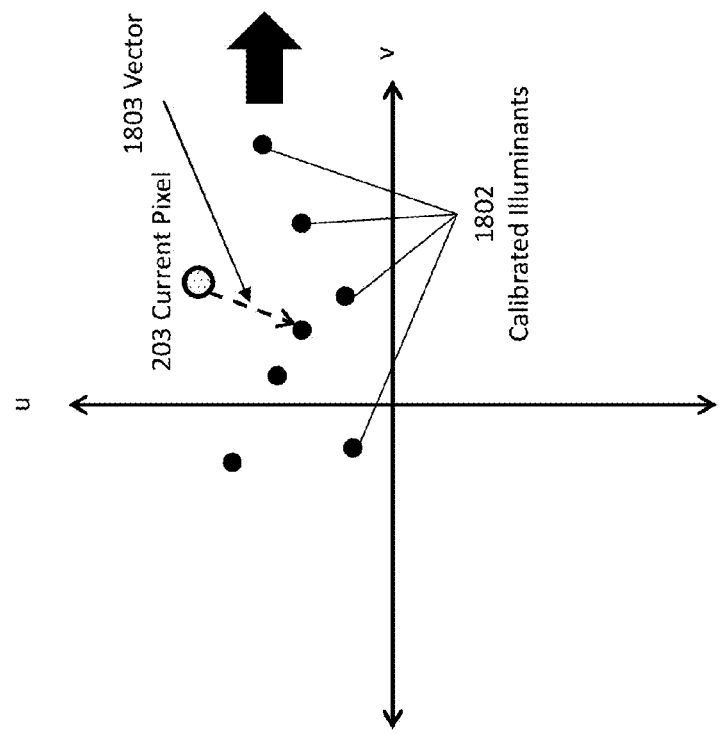

Referring now to FIGS. 18A and 18B, there is shown an example of a method for selecting an illuminant for a scene and its corresponding white balance factors, according to one embodiment. Camera 800 is calibrated with a variety of known illuminants, and the chrominance of each illuminant is stored. When a light field image is captured, the demosaiced chrominance value is calculated for each pixel 203. The chrominance of each pixel 203 is plotted in Cartesian space, where each axis represents one of the two chrominance variables. In this chrominance space, a vector is calculated between each pixel's 203 chrominance and the known chrominance of the calibrated illuminants 1802. The illuminant associated with the smallest vector length 1803 is then selected and stored. This is performed for every non-saturated pixel 203. As described below, saturated pixels have corrupted chrominance values. A histogram 1811 indicating how many pixels 203 correspond to each illuminant 1812 (i.e., for how many pixels 203 each illuminant 1812 was selected) is then computed. The illuminant 1812A with the largest value in histogram 1811, (i.e., the illuminant 1812A selected by the most pixels 203) is used as the scene illuminant along with its corresponding white balance factors.

Improving Accuracy of Pixel Values in the Presence of Saturation

The above-described sequence of demodulation followed by demosaicing is intended to generate pixels with accurate chrominance and luminance. Accuracy in these calculations presumes that the pixel values in the sensor image are themselves accurate. However, in cases where sensor saturation has taken place, the pixel values themselves may not be accurate. Specifically, sensor saturation may corrupt both pixel chrominance and luminance when they are computed as described above.

According to various embodiments of the present disclosure, the accuracy of pixel values can be improved, even when they are computed in the presence of sensor saturation. The following are two examples of techniques for improving the accuracy of pixel values; they can be applied either singly or in combination:

Single-channel pixel values in the sensor image can be directly adjusted, based on the estimation of the color of scene illumination; and The chrominance of pixels can be steered toward the estimated chrominance of the scene illumination, in proportion to the risk that these colors are corrupted due to sensor saturation.

For example, consider the case of complete sensor saturation, where all pixels 203—red, green, and blue—in a region are saturated. In such a situation, it is known that the luminance in the region is high, but chrominance is not known, because all r/g and b/g ratios are possible. However, an informed guess can be made about chrominance, which is that it is likely to be the chrominance of the scene illumination, or an approximation of it. This informed guess can be made because exceptionally bright objects in the scene are likely to be the light source itself, or specular reflections of the light source. Directly-imaged light sources are their own chrominance. The chrominance of specular reflections (reflections at high grazing angles, or off mirror-like surfaces at any angle) may also be the chrominance of the light source, even when the object's diffuse reflectivity has spectral variation (that is, when the object is colored). While objects of any chrominance may be bright enough to cause sensor saturation, gray objects, which reflect all visible light equally, are more likely to saturate all three color channels simultaneously, and will also take on the chrominance of the scene illumination.

If a sensor region is only partially saturated, then some information about chromaticity may be inferred. The pattern of saturation may rule out saturation by the scene illumination chrominance, if, for example, red pixels 203 are saturated and green pixels 203 are not, but the r/g ratio of the scene illumination color is less than one. But the presence of signal noise, spatial variation in color, and, especially in light-field cameras, high degrees of disk modulation, make inferences about chrominance uncertain even in such situations. Thus the chrominance of the scene illumination remains a good guess for both fully and partially saturated sensor regions.

Clamping Sensor Values to the Color of the Scene Illumination

The sensitivity of digital sensor 803 (its ISO) may be adjusted independently for its red, green, and blue pixels 203. In at least one embodiment, it may be advantageous to adjust relative sensitivities of these pixels 203 so that each color saturates at a single specific luminance of light corresponding to the chrominance of the scene illumination. Thus, no pixels 203 are saturated when illuminated with light of the scene-illumination chrominance at intensities below this threshold, and all pixels 203 are saturated when illuminated with light of the scene-illumination chrominance at intensities above this threshold.

An advantage of such an approach is that quantization error may be reduced, because all pixels 203 utilize their full range prior to typical saturation conditions. Another advantage is that, at least in sensor regions that experience relatively constant modulation, sensor saturation effectively clamps chrominance to the chrominance of the illuminant. Thus, subsequent demosaicing will infer the chrominance of the illuminant in clamped regions, because the r/g and b/g ratios will imply this chrominance. Even when modulation does change rapidly, as it may in a light-field image, the average demosaiced chrominance approximates the chrominance of the scene illumination, even while the chrominances of individual pixels 203 depart from this average.

Figure 19:
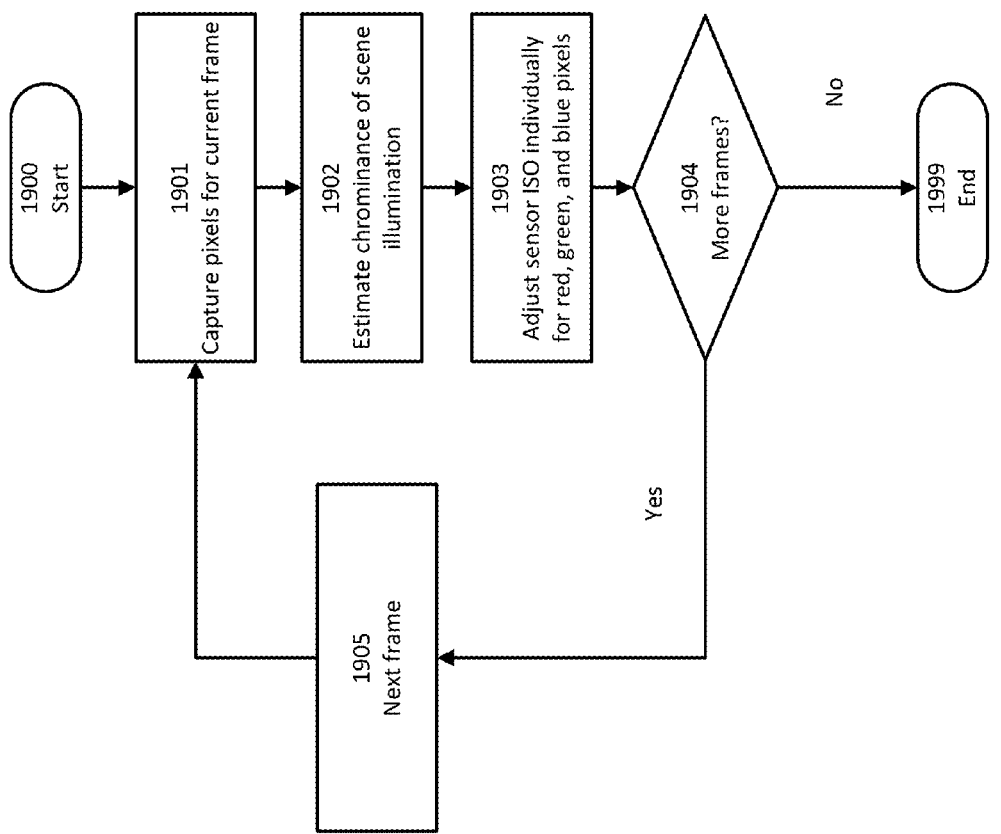
FIG. 19 is a flow diagram depicting a method of iteratively adjusting sensor ISO, according to one embodiment.

Referring now to FIG. 19, there is shown a flow diagram depicting a method of iteratively adjusting sensor ISO, according to one embodiment. An assumption can be made that the chrominance of the scene illumination does not change substantially from frame to frame. Accordingly, as depicted in FIG. 19, sensor ISO for each subsequent captured frame can be adjusted as follows. Pixels 203 for the current frame are captured 1901. The captured pixels are processed through demodulation, demosaicing, and AWB to estimate 1902 the chrominance of the scene illumination. Using the resulting estimation of this chrominance, sensor ISO (a.k.a. gain) is adjusted 1903 individually for red, green, and blue pixels 203. If more frames are available 1904, the next frame is taken 1905, and steps 1901 through 1903 are repeated using that frame's pixels 203.

Figure 20:
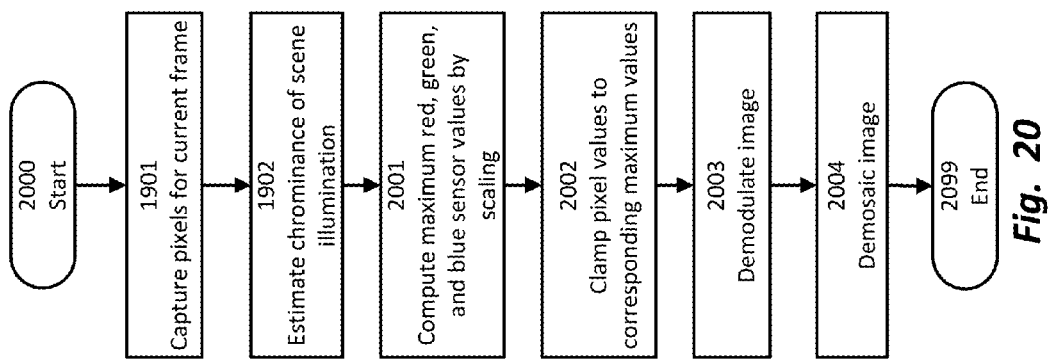
FIG. 20 is a flow diagram depicting a method of clamping pixel values to chrominance of scene illumination, according to one embodiment.

A feedback loop as depicted in FIG. 19 may be feasible if implemented on a camera or other image capture device. However, such feedback is not generally available when a sensor image is being processed after it has been captured, stored, and possibly transferred to another device, since it is then too late to specify adjusted sensor ISO for subsequent images. In such cases, the pixel values can still be clamped to the chrominance of the scene illumination. Referring now to FIG. 20, there is shown a flow diagram depicting a method for clamping pixel values to chrominance of scene illumination, according to one embodiment.

Pixels 203 for the current frame are captured 1901. The captured pixels 203 are processed through demodulation, demosaicing, and AWB to estimate 1902 the chrominance of the scene illumination. Maximum red, green, and blue sensor values are computed 2001 by scaling the red, green, and blue components of the scene-illumination chrominance equally, such that the largest component is equal to 1.0. The value of each pixel 203 in the sensor image is clamped 2002 to the corresponding maximum value. As an optimization, pixels of the color channel whose maximum is 1.0 need not be processed, because they have already been limited to this maximum by the mechanics of sensor saturation.

After the sensor image has been clamped 2002 in this manner, it may be demodulated 2003 and demosaiced 2004 again before subsequent processing is performed. As an optimization, the color channel that was not clamped (because its maximum was already 1.0) need not be demodulated again, but the other two color channels may be. The method may then end 2099.

Figure 10:
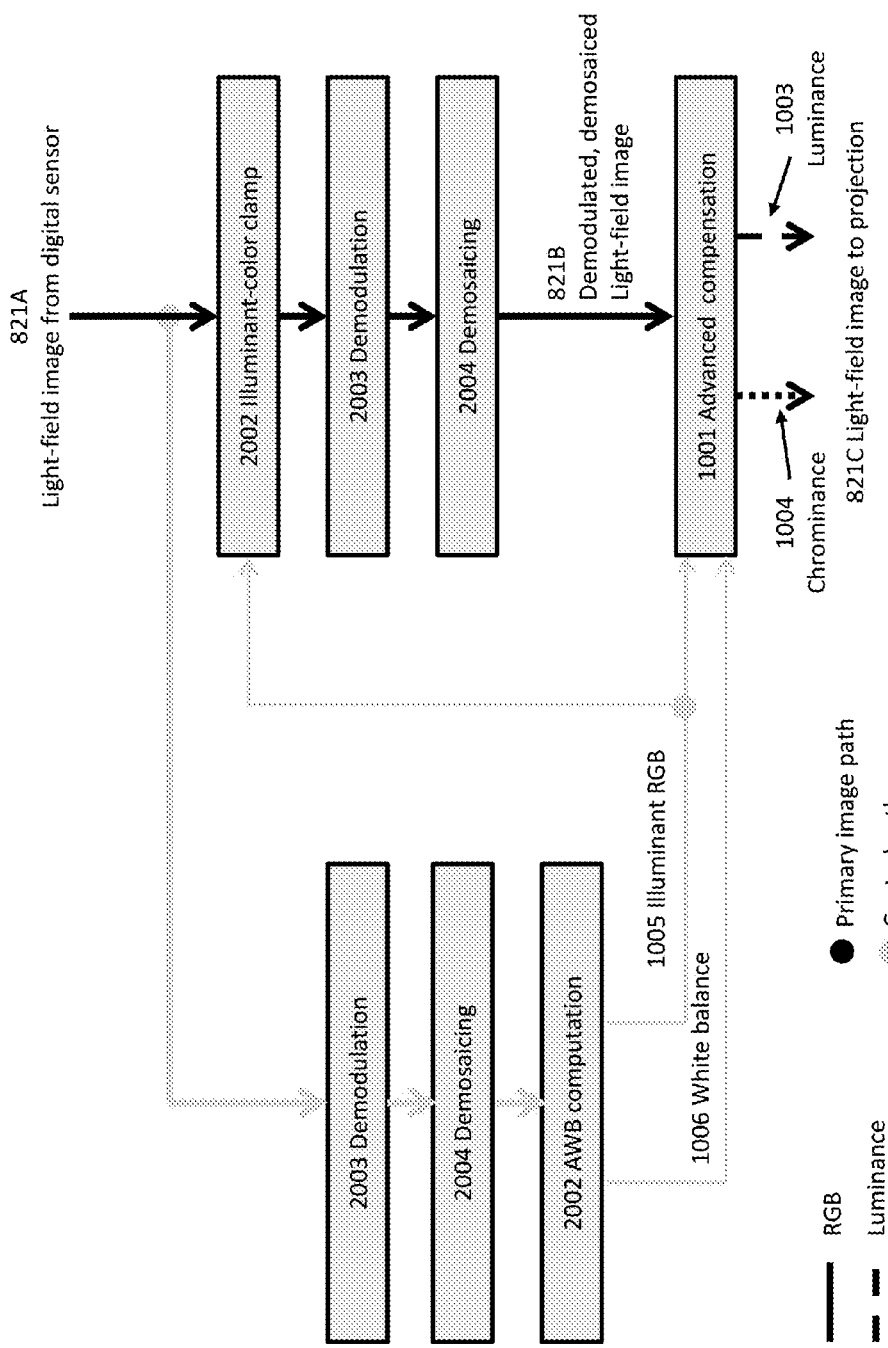
FIG. 10 is a flow diagram depicting a method for pre-projection light-field image processing according to one embodiment.

Referring now to FIG. 10, there is shown a flow diagram depicting a method for pre-projection light-field image processing according to one embodiment. Light-field image data 821A is received from digital sensor 803. Clamping 2002 is performed on red, blue and green color components, followed by demodulation 2003 and demosaicing 2004, as described above, to generate demodulated, demosaiced light-field image data 821B. In at least one embodiment, advanced compensation 1001 is performed on red, blue, and green components, as described in more detail below in connection with FIG. 12. The output of advanced compensation 1001 is light-field image data 821C in the form of luminance 1003 and chrominance 1004 values.

A control path is also depicted in FIG. 10. Light field image data 821A is used for controlling the parameters of demodulation 2003 and demosaicing 2004 steps. AWB computation 1002 generates illuminant RGB value 1005 and white balance value 1006, that are used as control signatures for advanced compensation 1002, as described in more detail below in connection with FIG. 12. Illuminant RGB value 1005 is also used as a control signal for illuminant-color clamp operation 2002, as described above.

Figure 11:
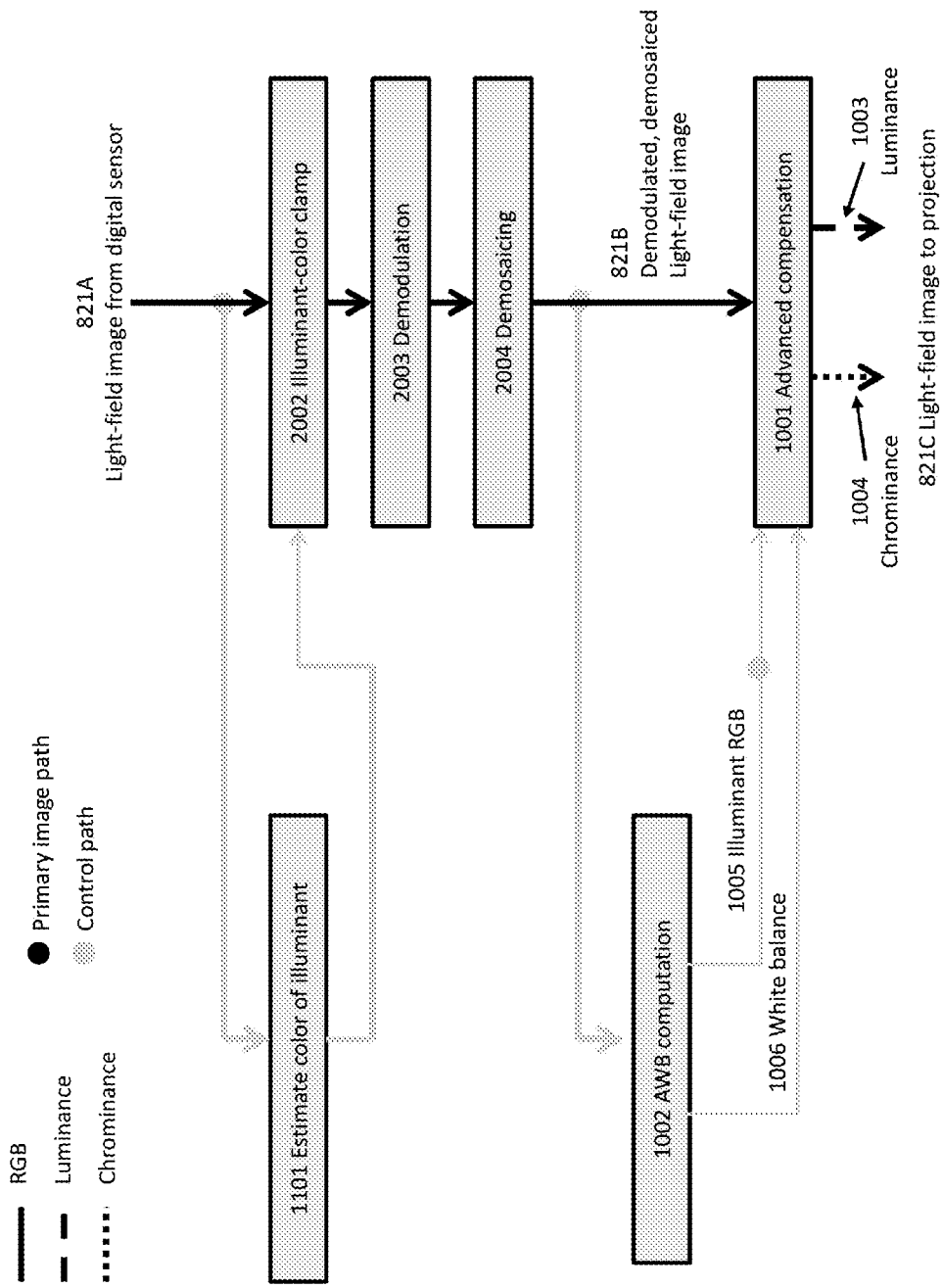
FIG. 11 is a flow diagram depicting a simplified method for pre-projection light-field image processing, according to another embodiment.

In at least one embodiment, a simpler technique for pre-projection light-field image processing is used, wherein the chrominance of the illuminant is actually computed twice, first as a rough approximation (which does not require that the image be first demodulated and demosaiced), and then again after the image is clamped, demodulated, and demosaiced, when it can be computed more accurately for subsequent use. Referring now to FIG. 11, there is shown a flow diagram depicting this simplified method. Here, illuminant color for clamp 2002 is estimated 1101 from light-field image data 821A, rather than by using demodulation 2003 and demosaicing 2004 steps. Demodulation 2003 and demosaicing 2004 steps are still performed, to generate image data 821B used as input to advanced compensation step 1001. AWB computation 1002 still takes place, using control signals from demodulation 2003 and demosaicing 2004 steps.

The technique of FIG. 11 may provide improved efficiency in certain situations, because it avoids the need for twice demodulation and demosaicing the full light-field image data 821A. As a trade-off, however, the technique of FIG. 11 involves twice computing illuminant chrominance, once in step 1101 (as an estimate), and again in step 1002.

Advanced Compensation

While the above-described light-field clamping technique section substantially reduces false-color artifacts in images projected from the light field, some artifacts may remain. In one embodiment, additional techniques can be applied in order to further reduce such artifacts, especially to the extent that they result from sensor saturation.

Figure 7:
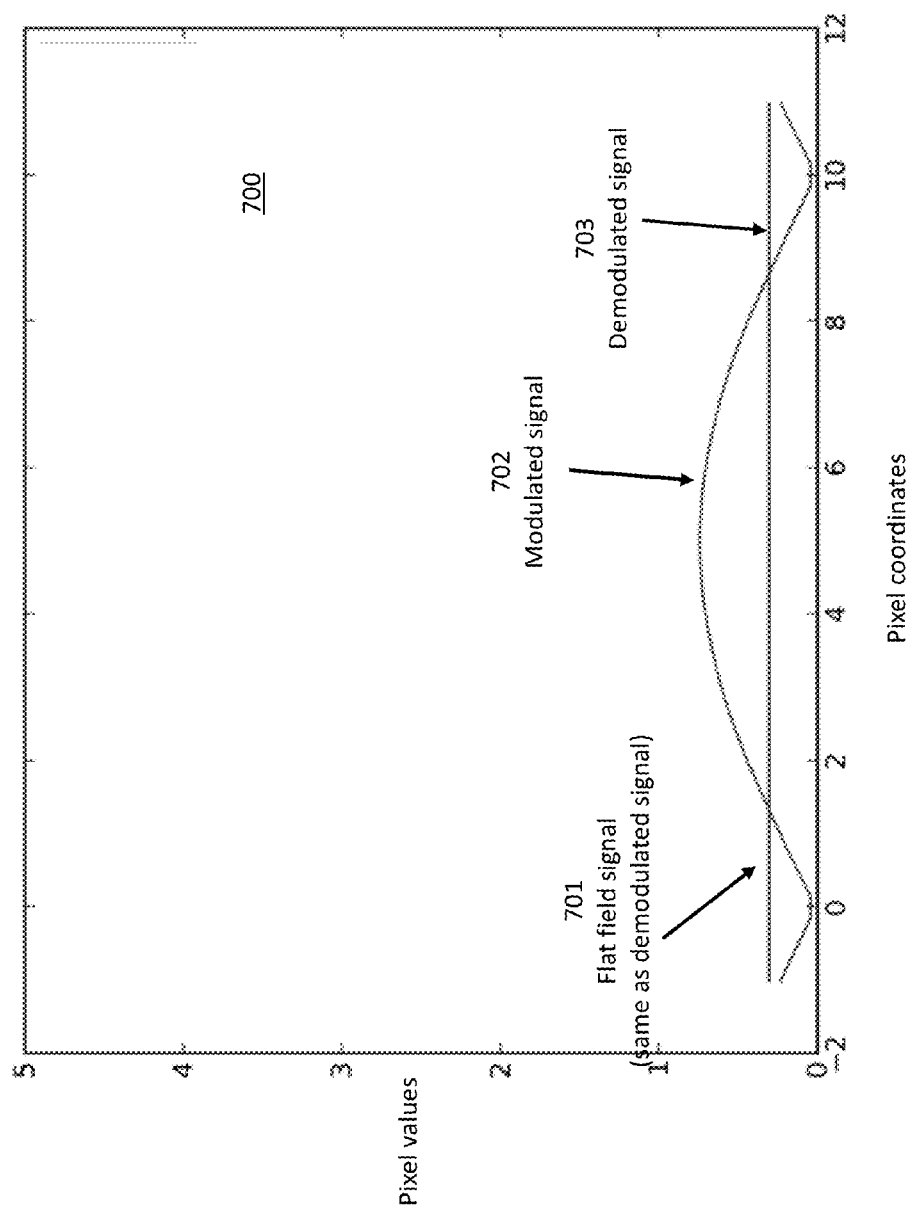
FIG. 7 is a graph depicting an example of unsaturated demodulation of a flat field.

Referring now to FIG. 7, there is shown a graph 700 depicting an example of unsaturated demodulation of a flat field associated with a disk 102. As shown in graph 700, modulated signal 702 does not exceed 1.0, the maximum representable value in the sensor itself; accordingly, there is no sensor saturation, and no pixel values are clamped. Thus, demodulated signal 703 is identical to flat-field signal 701.

Figure 8:
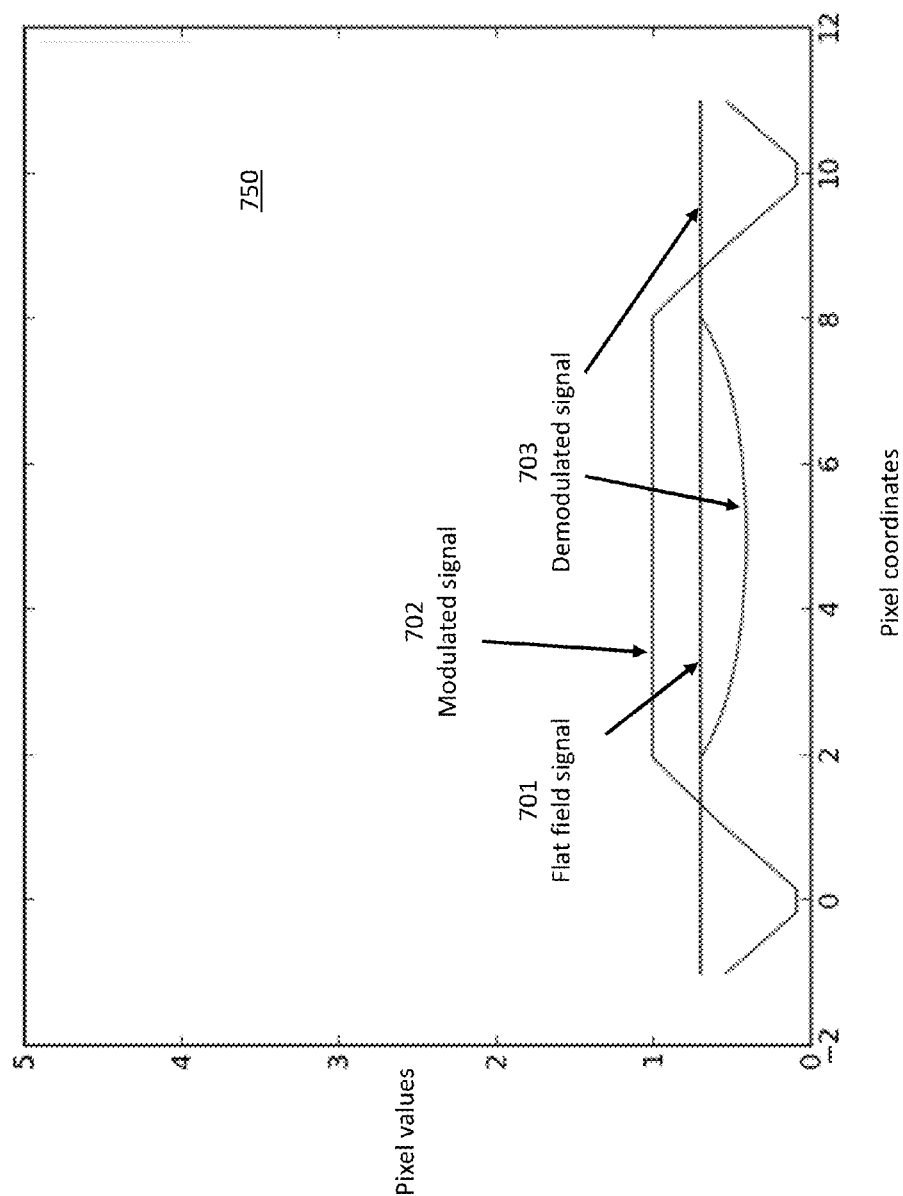
FIG. 8 is a graph depicting an example of saturated demodulation of a flat field having higher luminance.

Referring now to FIG. 8, there is shown a graph 750 depicting an example of saturated demodulation of a flat field having higher luminance. Here, values of modulated signal 702 near the center of disk 102 exceed 1.0, but they are clamped to 1.0 by sensor saturation. As a result of this signal corruption, demodulated signal 703 does not match original flat-field signal 701. Instead, demodulated signal 703 dips into a U-shaped arc corresponding to the center area of disk 102.

Figure 9:
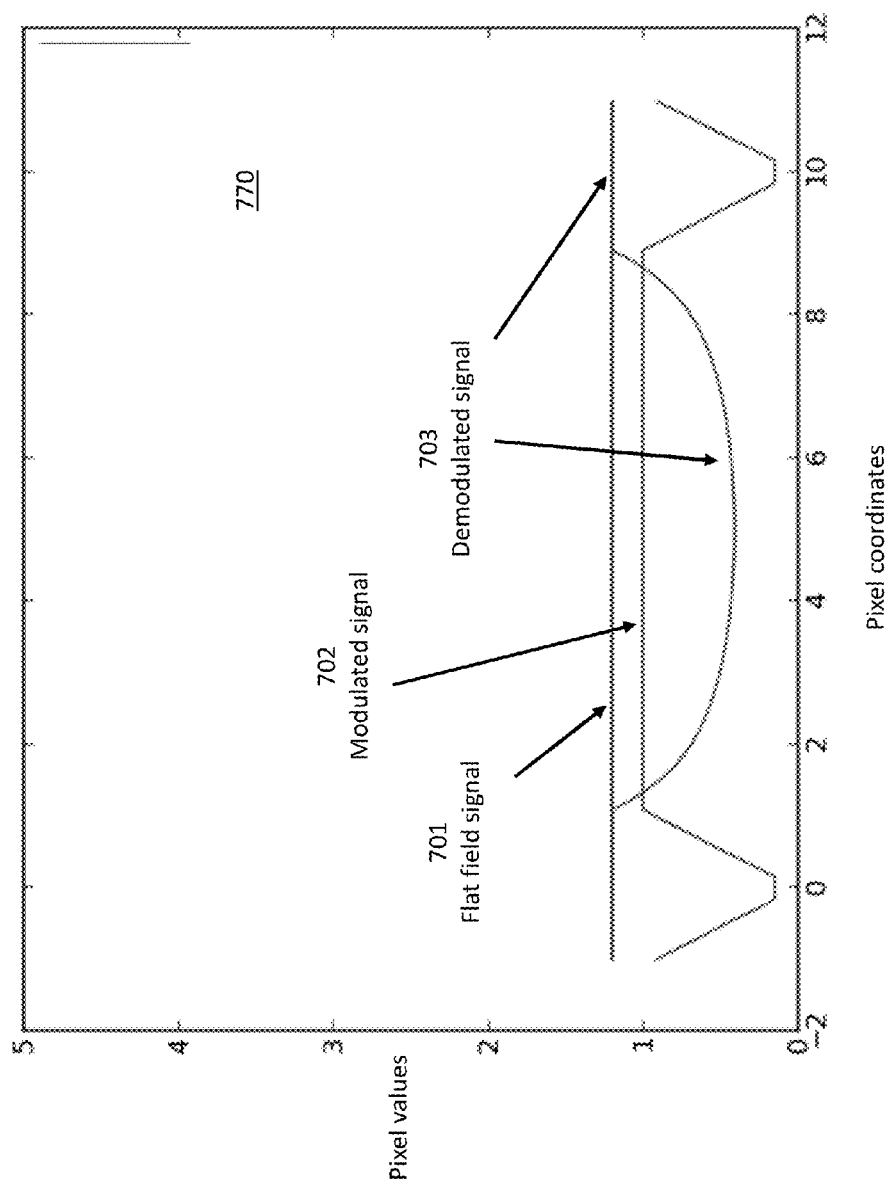
FIG. 9 is a graph depicting an example of extremely saturated demodulation of a flat field having higher luminance.

Referring now to FIG. 9, there is shown a graph 770 depicting an example of extreme saturation. Here, demodulated signal 703 matches original flat-field signal 701 only at the edges of disk 102. Demodulated signal 703 is characterized by a deep U-shaped arc corresponding to the center area of disk 102, falling to a value that is a small fraction of the original signal value.

Figure 12:
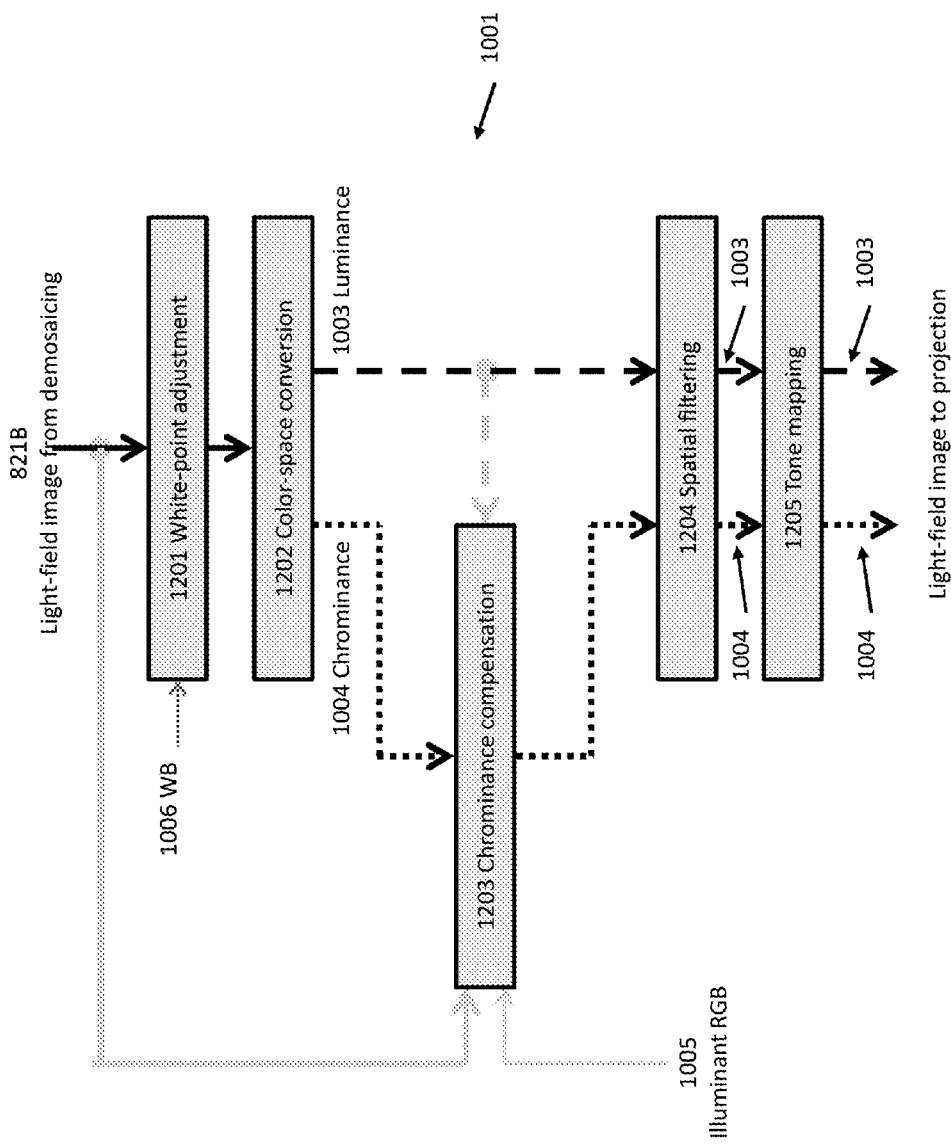
FIG. 12 is a flow diagram depicting advanced compensation as can be used in connection with either of the methods depicted in FIGS. 10 and/or 11, according to one embodiment.

Because proportionality is violated by this uneven signal reconstruction, subsequent demosaicing may result in incorrect chrominances, causing artifacts. Artifacts in luminance may also occur, depending on the 2-D pattern of ray intersections with the plane of projection. In one embodiment, such saturation-related artifacts are minimized by subsequent processing, referred to herein as advanced compensation. Referring now to FIG. 12, there is shown a flow diagram depicting a method 1001 of advanced compensation, according to one embodiment. This method can be used in connection with either of the methods described above in connection with FIGS. 10 and/or 11.

In the advanced compensation method depicted in FIG. 12, previously computed white-balance value 1006 is applied, in a white-point adjustment step 1201. As described earlier, in white-point adjustment process 1201, each pixel color component is scaled by a corresponding white-balance scale factor. For example, the red component of each pixel in the light field image is scaled by the red white-balance factor. In one embodiment, white-balance factors may be normalized, so that their application may make no change to the luminance of the light-field image, while affecting only its chrominance.

Color-space conversion step 1202 is then performed, wherein each pixel's 203 red, green, and blue components are converted into chrominance 1004 and luminance 1003 signals. As described above, chrominance may be represented as a 2-component tuple, while luminance may be represented as a single component. Any known technique can be used for converting red, green, and blue components into chrominance 1004 and luminance 1003 signals, and any known representations of chrominance 1004 and luminance 1003 can be used. Examples include YUV (Y representing luminance 1003, U and V representing chrominance 1004) and L*a*b* (L* representing luminance 1003, a* and b* representing chrominance 1004). Some representations, such as YUV, maintain a linear relationship between the intensity of the RGB value (such an intensity may be computed as a weighted sum of red, green, and blue) and the intensity of luminance 1003 value. Others, such as L*a*b*, may not maintain such a linear relationship. It may be desirable for there to be such a linear relationship for chrominance 1004 and/or for luminance 1003. For example, luminance value 1003 may be remapped so that it maintains such a linear relationship.

In at least one embodiment, three additional operations, named chrominance compensation 1203, spatial filtering 1204, and tone mapping 1205, are performed separately on chrominance 1004 and luminance 1003 signals, as described in more detail below.

Chrominance Compensation 1203

Figure 13:
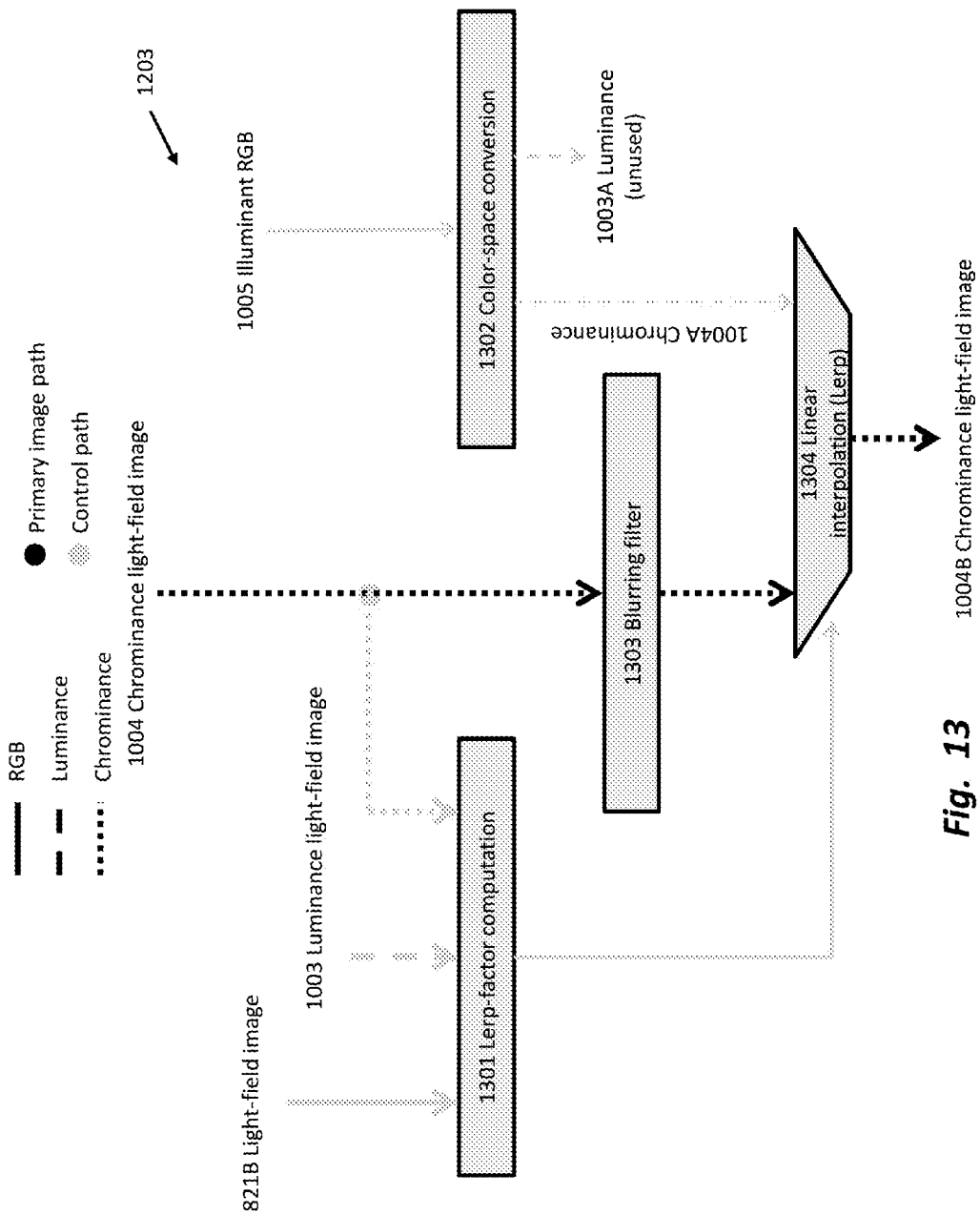
FIG. 13 is a flow diagram depicting a method of chrominance compensation, according to one embodiment.

Referring now to FIG. 13, there is shown a flow diagram depicting a method of chrominance compensation 1203, as can be implemented as part of advanced compensation method 1001, according to one embodiment. In one embodiment, chrominance compensation is applied only to the chrominance component 1004 of light-field image 821B, also referred to as chrominance light-field image 1004.

Each pixel 203 in chrominance light-field image 1004 is considered individually. Lerp-factor computation 1301 estimates the severity of each pixel's 203 saturation, and the likelihood that the chrominance of that saturation matches (or approximates) the estimated chrominance of the scene illumination. For example, if a pixel's luminance value is near saturation, it is more likely that the chrominance value is wrong. Accordingly, in at least one embodiment, the system of the present disclosure uses a weighting between saturation and near saturation to determine how much to shift the chrominance value.

When a pixel's 203 saturation is severe, and there is high likelihood that the pixel's chrominance is equal to the chrominance of the scene illumination, the pixel's 203 chrominance is replaced with the chrominance of the scene illumination. When there is no saturation, the pixel's 203 chrominance is left unchanged. When the pixel's 203 saturation is moderate, and there is an intermediate probability that the saturation is equal to the estimated chrominance of the scene illumination, Lerp-factor computation 1301 produces an output that is intermediate between 0.0 and 1.0. This intermediate value causes the pixel's 203 chrominance to be replaced with a linear combination (such as a linear interpolation, or "Lerp") 1304 between the pixel's 203 original chrominance and the chrominance of the scene illumination. For example, if the computed Lerp factor was 0.25, and the pixel's 203 chrominance representation was UV, then the output of the linear interpolation would be $$U' = (1.0 - 0.25)U + 0.25 U_{illumination} \quad \text{(Eq. 1)}$$

$$V' = (1.0 - 0.25)V + 0.25 V_{illumination} \quad \text{(Eq. 2)}$$

Any of a variety of Lerp-factor computation algorithms may be used. For example, a simple calculation might combine the red (R), green (G), and blue (B) components of the pixel 203, prior to its color-space conversion, as follows:

$$f_{lerp} = G(1 - |R - B|) \quad \text{(Eq. 3)}$$

In another embodiment, the Lerp factor can be computed by look-up into a two-dimensional table, indexed in one dimension by an estimation of the severity of saturation, and in the other dimension by an estimation of how closely the saturation chrominance approximates the estimated chrominance of the scene illumination. These indexes can be derived from any functions of the pixel's 203 pre-color-space-conversion R, G, and B values, and its post-color-space-conversion luminance 1003A and chrominance 1004A values (as derived from color-space conversion step 1302). FIG. 13 illustrates this generality by providing all these values 821B, 1003, 1004, 1003A, 1004A, as inputs to Lerp-factor computation step 1301, and/or to Lerp step 1304. The look-up itself can interpolate the nearest values in the table, such that its output is a continuous function of its indexes.

Although linear interpolation is described herein for illustrative purposes, one skilled in the art will recognize that any other type of blending or interpolation can be used.

It may be desirable to blur the chrominance light-field image 1004 prior to linear interpolation 1304 with the estimated chrominance of the scene illumination. Blurring filter 1303 may thus be applied to chrominance light-field image 1004 before it is provided to linear interpolation step 1304.

Spatial Filtering 1204

Figure 14:
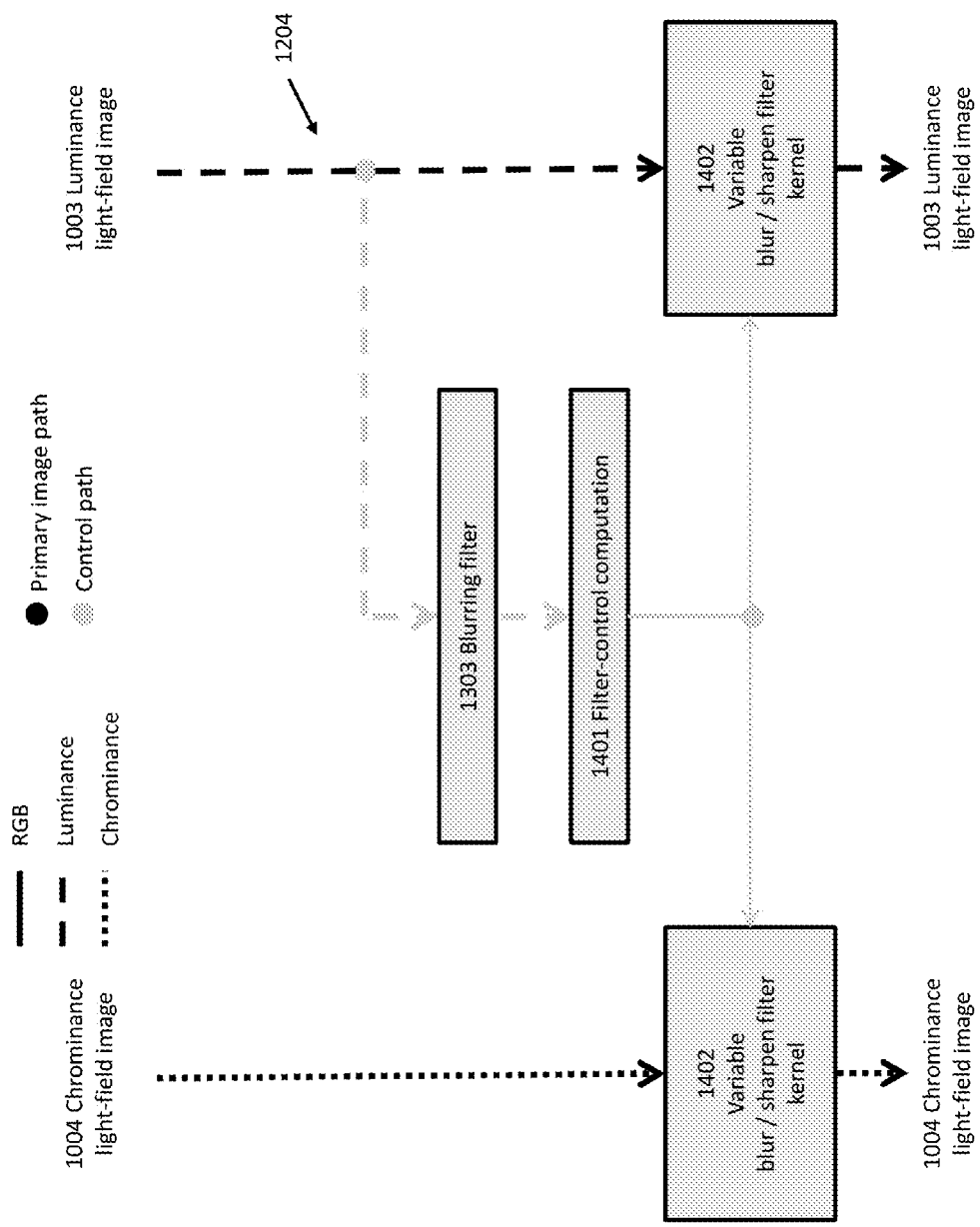
FIG. 14 is a flow diagram depicting a method of spatial filtering, according to one embodiment.

Referring now to FIG. 14, there is shown is a flow diagram depicting a method of spatial filtering 1204, as can be implemented as part of advanced compensation method 1001, according to one embodiment.

In one embodiment, spatial filtering 1204 is applied separately to both the luminance 1003 and chrominance 1004 light-field images. An individualized variable blur/sharpen filter kernel 1402 is used to compute each output pixel's 203 value. This kernel 1402 may either sharpen or blur the image, as specified by a continuous value generated by filter control computation 1401.

In at least one embodiment, input to filter control computation 1401 is a single pixel 203 of a blurred version of luminance light-field image 1003, as generated by blurring filter 1303. In at least one embodiment, filter control computation 1401 estimates the likelihood and severity of pixel saturation, without consideration for the chrominance of that saturation. When saturation is present, filter control computation 1401 generates a value that causes kernel 1402 to blur the light-field images. Such blurring may serve to smooth uneven demodulated values. When saturation is not present, filter control computation 1401 generates a value that causes kernel 1402 to sharpen the images. Such sharpening may compensate for blurring due to imperfect microlenses and due to diffraction. Intermediate pixel conditions result in intermediates between blurring and sharpening of the light-field images.

In one embodiment, two filtered versions of the light-field image are generated: an unsharp mask, and a thresholded unsharp mask in which the positive high-pass image detail has been boosted and the negative high-pass detail has been eliminated. The system then interpolates between these versions of the image using filter control computation 1401. When filter control computation 1401 has a low value (in regions that are not saturated), the unsharp mask is preferred, with the effect of sharpening the image. When filter control computation 1401 has a high value (in regions that are likely to be saturated), the thresholded unsharp mask is preferred. Thresholding "throws out" negative values in the high-pass image, thus removing clamped demodulated pixel values in the saturated region, and leaving valuable demodulated interstitial pixel values.

In various embodiments, any of a variety of filter control computation 1401 algorithms may be used.

Tone Mapping 1205

Figure 15:
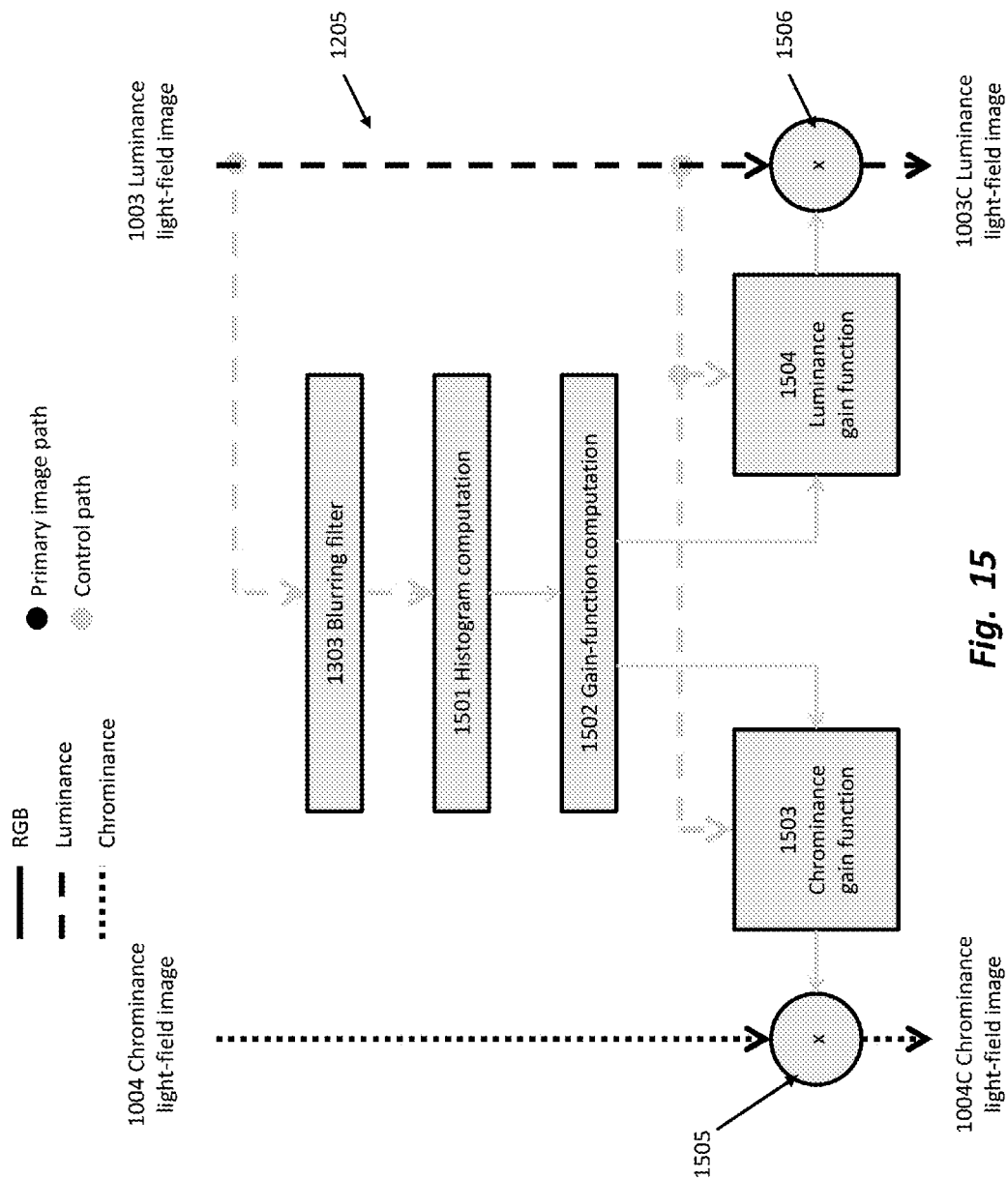
FIG. 15 is a flow diagram depicting a method of tone mapping, according to one embodiment.

Referring now to FIG. 15, there is shown is a flow diagram depicting a method of tone mapping 1205, as can be implemented as part of advanced compensation method 1001, according to one embodiment.

In one embodiment, spatial filtering 1204 is applied separately to both the luminance 1003 and chrominance 1004 light-field images. Before any light-field pixels 203 are processed, two gain functions are computed: a luminance gain function 1504 and a chrominance gain function 1503. Functions 1503, 1504 may have any of a variety of representations. For example, they may be represented as one-dimensional tables of values. Each function 1503, 1504 maps an input luminance value 1003 to an output scale factor. After the functions have been created, pixels 203 in the incoming chrominance and luminance light-field images 1004, 1003 are processed individually, in lock step with one another. The luminance pixel value is presented as input to both gain functions 1503, 1504, generating two scale factors: one for chrominance and one for luminance. Both components of the chrominance pixel value are multiplied 1505 by the chrominance scale factor determined by gain function 1503, in order to generate the output chrominance pixel values for output chrominance light-field image 1004C. The luminance pixel value from luminance light-field image 1003 is multiplied 1506 by the luminance scale factor determined by gain function 1504, in order to generate the output luminance pixel values for output luminance light-field image 1003C.

Gain functions 1503, 1504 may be generated with any of a variety of algorithms. For example, in at least one embodiment, gain functions 1503, 1504 may be generated by applying a blurring filter 1303 to luminance light-field image 1003, then determining 1501 a histogram of luminance values taken from the blurred version, and computing 1502 gain functions 1503, 1504 therefrom. For example, gain-function computation 1502 may be performed by using the histogram data from step 1501 to shape the gain functions such that the values of pixels 203 processed by gain functions 1503, 1504 are more evenly distributed in the range from 0.0 to 1.0. Thus, in effect, the gain function weights the luminance channel so that the scene has an appropriate amount of dynamic range.

Synergy

The above described techniques can be implemented singly or in any suitable combination. In at least one embodiment, they are implemented in combination so as to can work synergistically to reduce color artifacts due to sensor saturation. For example, consider a scene with a region of increasing luminance but constant chrominance. The sensor region corresponding to this scene region may be divided into three adjacent sub-regions:

An unsaturated sub-region, in which all pixel values are reliable;

A transition sub-region, in which pixels of some colors are saturated, and pixels of other colors are not saturated; and A blown-out sub-region, in which all pixels are saturated.

Pixel values in the unsaturated sub-region will not be changed by clamping, and their chrominance will not be changed by interpolation. Pixels in the blown-out sub-region will be clamped such that subsequent demosaicing gives them chrominances clustered around of the estimated illumination color, with variation introduced by demodulation. The advanced compensation techniques described above may then be used to reduce these variations in pixel chrominance by interpolating toward the chrominance of the estimated scene-illumination color. Interpolation is enabled because 1) the sub-region is obviously blown out, and 2) the pixel chrominances do not vary too much from the chrominance of the estimated scene-illumination color.

If the chrominance of the scene region matches the chrominance of the estimated scene-illumination color, there will be no transition sub-region; rather, the unsaturated sub-region will be adjacent to the blown-out sub-region. If the chrominance of the scene region differs somewhat from the chrominance of the estimated scene-illumination color, there will be a transition sub-region. In this transition sub-region, clamping ensures that any large difference between pixel chrominance and the chrominance of the estimated scene-illumination color is the result of a true difference in the scene region, and not the result of sensor saturation (which, depending on gains, could substantially alter chrominance). Small differences will then be further reduced by the advanced compensation techniques described above as were small differences in the saturated sub-region. Large differences, which correspond to true differences in the saturated sub-region, will not be substantially changed by advanced compensation techniques, allowing them to be incorporated in the final image.

Variations

The techniques described above can be extended to include any or all of the following, either singly or in any combination.

Demodulation of a light-field image;

Taking samples only from selected portions of disks 102 to the AWB computation; these may be the centers of disks 102, or any other suitable portions of disks 102, depending on MLA shape and modulation function;

Computing an estimate of the color of the scene illumination, scaling this estimate such that its maximum value is one, and then clamping every pixel 203 in the Bayer light-field image to the corresponding component;

Color compensation; and

Filtering separately in luminance and chrominance domains to recover the maximum amount of scene dynamic range and detail while suppressing noise and highlight artifacts.

Saturation Recovery

The techniques described above can be extended to include any or all of the following, either singly or in any combination.

In addition to or in the alternative to the techniques described above, image processing steps may be used to recover the value of one or more saturated pixels of a light-field image. In this application, "recovery" of a saturated value does not require acquisition of the value that would have been obtained by a sensor without saturation limitations; rather, "recovery" refers to a process by which the effects of pixel saturation are at least partially compensated for. The resulting saturation-recovered pixel may thus not have the value that would have been recorded by a sensor without saturation limitations, but it may have a value that is an approximation of it.

Referring to FIGS. 21A and 21B, graphs 2100 and 2150 depict the effects of modulation on an unsaturated light-field image and a saturated light-field image, respectively. More specifically, the graph 2100 illustrates a light-field image, a modulation image, and a demodulated light-field image, where no saturation is present. The graph 2150 illustrates a clamped light-field image, a modulation image, and a demodulated clipped light-field image.

As shown in FIG. 21A, the light-field image of the graph 2100 has peaks 2110, each of which may represent the light received through the center of one microlens of the microlens array 802. The light-field image also has valleys 2120, each of which may represent the light received proximate the edge of a microlens or between adjacent microlenses. Thus, each peak 2110 may represent the center of a disk 102, and each valley 2120 may represent the periphery of a disk 102. The shape of each cycle of the light-field image of the graph 2100 may resemble that of the graph of FIG. 4, which depicts pixel values for a single disk 102. The light-field image of the graph 2100 has uniform peaks 2110 and valleys 2120, and may thus relate to a light-field image with relatively uniform luminance, such as a flat field.

As further shown in FIG. 21A, the modulation image also has peaks 2130 and valleys 2140, which may correspond to the peaks 2110 and valleys 2120 of the light-field image of the graph 2100. The modulation image may be obtained, for example, the capture of a light-filed from a flat field (i.e., uniformly-illuminated space), as described above. The modulation image may be applied to the light-field image through the use of the computational steps described previously to obtain the demodulated light-field image.

In FIG. 21A, the demodulated light-field image is a flat line 2145. This represents the fact that the modulation of the light-field image, caused by the microlens array 802, has been properly corrected to render the flat field captured by the light-field image of the graph 2100 as having uniform luminance. This may be similar to the result obtained and depicted in FIG. 7 above.

As shown in FIG. 21B, the clamped light-field image of the graph 2150 has peaks 2160, each of which may represent the light received through the center of one microlens of the microlens array 802. The light-field image also has valleys 2170, each of which may represent the light received proximate the edge of a microlens or between adjacent microlenses. Thus, each peak 2160 may represent the center of a disk 102, and each valley 2170 may represent the periphery of a disk 102. The shape of each cycle of the light-field image of the graph 2150 may resemble that of the graph of FIG. 9, which depicts pixel values for a single disk 102 when the pixel values are clamped (i.e., subject to a maximum value, such as the maximum value recordable by the sensor 803 of the camera 800) due to sensor saturation. The light-field image of the graph 2150 has uniform peaks 2160 and valleys 2170, and may thus relate to a light-field image with relatively uniform luminance, such as a flat field that provides luminance that exceeds the sensor capacity at the centers of the disks 102.

As further shown in FIG. 21B, the modulation image also has peaks 2180 and valleys 2190, which may correspond to the peaks 2160 and valleys 2170 of the clamped light-field image. The modulation image of the graph 2150 may be the same as the modulation image of the graph 2100, and may thus be obtained from a flat field as set forth in the description of FIG. 21A. FIGS. 21A and 21B may relate to flat field images taken with the same camera 800, with the flat field captured in FIG. 21A of relatively low luminance (so as to remain below the sensor maximum, even at the center of each microlens), and the flat field captured in FIG. 21B of relatively high luminance (so as to exceed the sensor maximum at the center of each microlens).

In FIG. 21B, the demodulated clipped light-field image is not a flat line, but rather has scallops 2195 that correspond to the peaks 2160 of the clamped light-field image of the graph 2150, and plateaus 2198 that correspond to the valleys 2170 of the clamped light-field image of the graph 2150. This may be caused by the clamping of the light-field image of the graph 2150; application of the modulation image to the clamped light-field image may effectively over-compensate for the modulation effect of the microlens array 802 due to the fact that some pixels of the clamped light-field image have values that are limited by the sensor 803 of the camera 800. This may be similar to the result obtained and depicted in FIG. 9 above. It may be desirable to correct the effects of saturation so that the intense, flat field captured in the clamped light-field image is properly demodulated to form a flat line, like the flat line 2145 of the graph 2100 of FIG. 21A.

This saturation correction, or saturation recovery, may be accomplished in a variety of ways. According to one method, an iterative algorithm may be applied to saturated pixels (i.e., artificially low value pixels) of the demodulated light-field image. One example will be shown and described in connection with FIG. 22.

Figure 22:
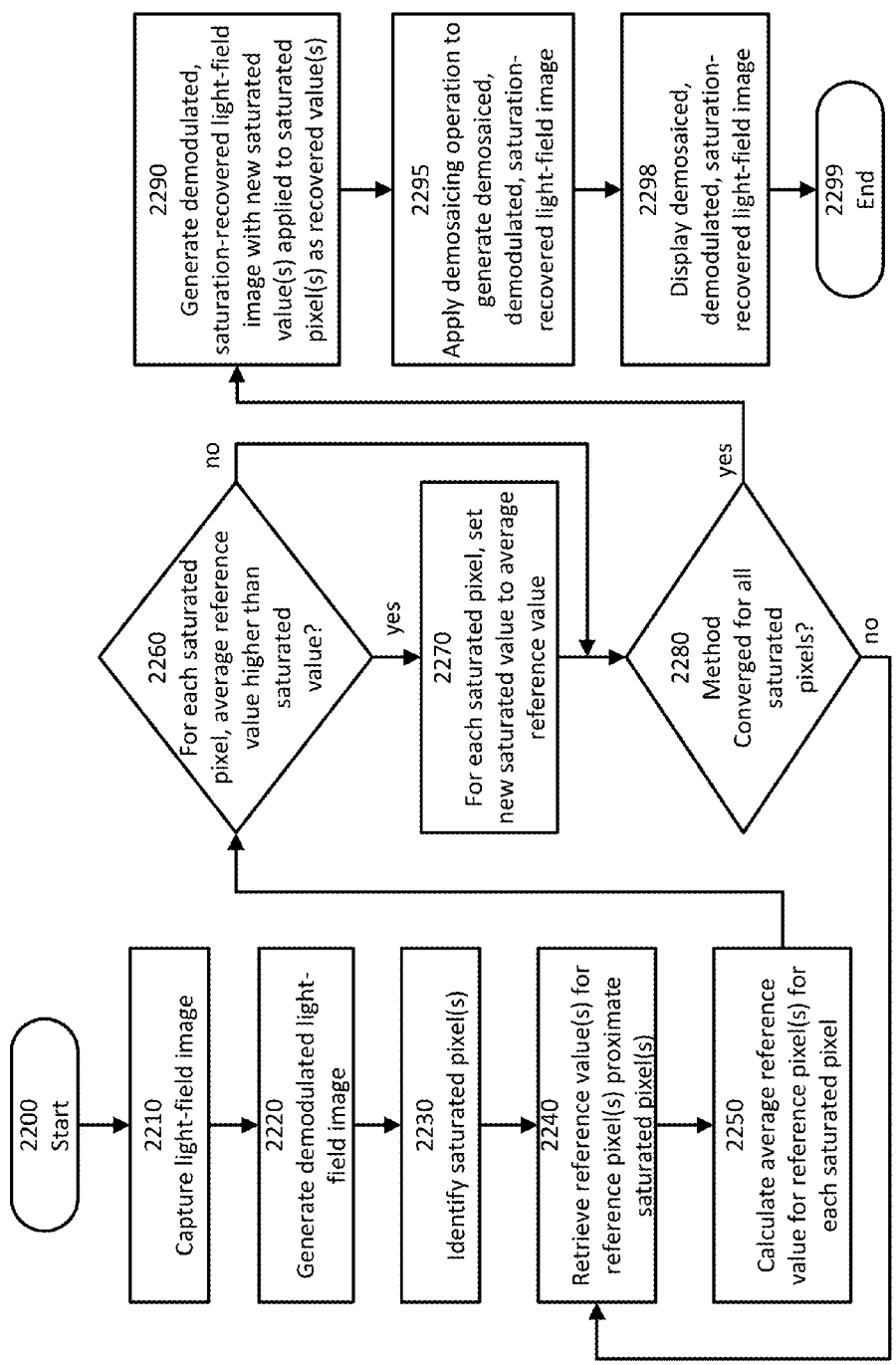
FIG. 22 is a flow diagram depicting a method for processing an image according to one embodiment, with pixel saturation recovery.

FIG. 22 is a flow diagram depicting a method for processing an image according to one embodiment, with pixel saturation recovery. The method may be performed on a modulated light-field in which saturated pixels are represented by artificially low values, as in the scallops 2195 of the demodulated clipped light-field image of FIG. 21B. The method may be performed, for example, with circuitry such as the post-processing circuitry 804 of the camera 800 of FIG. 16A or the post-processing circuitry 804 of FIG. 16B, which is independent of the camera 800. In some embodiments, a computing device may carry out the method; such a computing device may include one or more of desktop computers, laptop computers, smartphones, tablets, cameras, and/or other devices that process digital information.

The method may start 2200 with a step 2210 in which the light-field image is captured, for example, by the sensor 803 of the camera 800. In a step 2220, a demodulated light-field image may be generated for the captured light-field image. This may be done in any of the ways described previously. In some embodiments, demodulation may be carried out by first capturing a demodulation image such as the demodulation contour 601 of FIG. 6 and/or the demodulation image of FIGS. 21A and 21B. Such a demodulation image may be captured, for example, by capturing a flat field response, such as the flat field response 402 of FIG. 4, of a relatively uniformly-illuminated scene. The flat-field response may be transformed as described previously to yield the demodulation image.

In a step 2230, saturated pixels of the demodulated image may be identified. This may be done, for example, with reference to the (pre-demodulation) light-field image—any pixel within the light-field image with a value at the maximum value (or possibly near maximum value) that can be captured by the sensor 803 may be assumed to be saturated. The corresponding pixels of the demodulated light-field image may be identified as also being saturated. In other embodiments, the demodulated light-field image, itself, may be analyzed to identify the saturated pixels. For example, one or more mathematical algorithms may be applied to assess whether the value of a pixel fits the expected value of a saturated pixel in the demodulated light-field image. Thus, pixels that conform to the shape of the scallops 2195 of FIG. 21B may be assumed to be saturated.

In a step 2240, for each saturated pixel, one or more reference pixels may be identified. For a saturated pixel, a reference pixel is a pixel proximate the saturated pixel. Reference pixels may be arranged along one dimension relative to the saturated pixel (for example, located above and below, or left and right, of the saturated pixel in the demodulated light-field image). Additionally or alternatively, reference pixels may be arranged along two dimensions relative to the saturated pixel (for example, located above, below, to the left, and to the right of the saturated pixel in the demodulated light-field image). It may enhance the accuracy of saturated pixel recovery to identify reference pixels displaced from the saturated pixel along two dimensions. Where the reference pixels are above, below, to the left, and to the right of the saturated pixel, they may be displaced from the saturated pixel along directions that are orthogonal to each other.

In some embodiments, the demodulated light-field image may not yet have been subjected to a demosaicing process when the reference pixel(s) are identified. Thus, the reference pixels may be color-specific. If desired, the reference pixels may be the same color as the saturated pixel. For example, saturation recovery for a green pixel may be carried out using only green reference pixels. Alternatively, pixels of all colors may be used for saturation recovery. In some embodiments, demosaicing processing may be carried out prior to identification of the reference pixel(s). In such an event, the pixels of the demodulated, demosaiced lightfield image may not be color specific. Reference pixels may then be selected for a given saturated pixel based only on proximity and not on color.

Returning to the exemplary method of FIG. 22, the step 2240 may also include retrieval, from the demodulated light-field image, of the reference value(s) of the reference pixel(s). In the event that more than one reference pixel is identified, more than one reference value may be retrieved. If only one reference value is identified, the method may omit the step 2250 and rather than computing an average reference value, the single reference value may be used to perform the query 2260.

If more than one reference value is retrieved in the step 2240 (i.e., more than one reference pixel is identified in the step 2240), the method may proceed to a step 2250. In the step 2250, an average reference value may be calculated as the average of the reference values obtained in the step 2240. If desired, the individual reference values may be weighted or otherwise modified such that the step 2250 constitutes more than computation of a simple average. For example, the reference values may each be weighted such that pixels closer to the subject pixel (i.e., the saturated pixel for which the reference pixels were identified) are counted more heavily in the average reference value than reference values for reference pixels that are further from the subject pixel.

In a query 2260, a determination may be made, for each subject pixel (i.e., each saturated pixel), regarding whether the average reference value for that saturated pixel is higher than the saturated value for that saturated pixel. In this application, "saturated value" does not necessarily refer to the original value captured by the sensor 803 of the camera 800; rather, a "saturated value" is simply a value of a saturated pixel that has not yet been through the full recovery process.

If the average reference value for a saturated pixel is higher than the saturated value for that saturated pixel, the method may proceed to a step 2270 in which, for each saturated pixel that satisfies the query 2260, the new saturated value for that saturated pixel is set to the average reference value. Thus, a saturated pixel in the demodulated light-field image can be "brightened" (i.e., increased in value) based on the values of surrounding pixels, but may not be "darkened." If the average reference value is lower than the saturated value for a pixel, it will not satisfy the query 2260 and the saturated value of that pixel will not be changed.

After performance of the step 2270 (for all saturated pixels that satisfied the query 2260), or for pixels that did not satisfy the query 2260, after omission of the step 2270, the method may proceed to a query 2280. Pursuant to the query 2280, a determination may be made as to whether the method has converged for all saturated pixels. "Convergence" may be deemed to have occurred when further significant changes to pixels are unlikely and/or impossible with further iteration. Thus, convergence may be deemed to have occurred when, for an iteration, no pixel receives a new saturated value (i.e., the step 2270 is not carried out with respect to any pixels). Additionally or alternatively, convergence may be deemed to have occurred when the changes to pixels are below a predetermined aggregate threshold and/or a predetermined individual threshold.

If convergence has not occurred, the method may return to the step 2240 in which one or more new reference values are returned for each saturated pixel. The method may continue through the step 2250, the query 2260, and/or the step 2270, as applicable, until the query 2280 is answered in the affirmative.

In the alternative to the query 2280, a different query may be used that determines whether a predetermined number of iterations has been carried out. If the predetermined number of iterations has been carried out, the method may proceed to the next step. If not, the method may return to the step 2240 as indicated previously. Such a query may provide more predictable processing time, as the time required for the method to reach convergence may be difficult to predict. This predictability in processing time may come at the expense of less predictability in the completeness (i.e., quality) of the saturation recovery process. However, use of a number of iterations may facilitate tuning of the quality of the saturation recovery process. Specifically, a large number of iterations may be selected to provide more thorough saturation recovery, at the cost of greater processing time. Conversely, a small number of iterations may be selected to expedite saturation recovery while permitting less thorough demodulation.

Once the query 2280 is satisfied, the method may proceed to a step 2290 in which a demodulated, saturation-recovered light-field image is generated. In the demodulated, saturation-recovered light-field image, the final saturated value of each saturated pixel may be deemed to be a proper recovered value for that saturated pixel. Thus, the most recent saturated value for each saturated pixel may be applied as a recovered value for that saturated pixel in the demodulated, saturation-recovered light-field image. Consequently, in the demodulated, saturation-recovered light-field image, the effects of pixel saturation may be largely and/or approximately corrected.

In a step 2295, a demosaicing operation may be applied to the demodulated, saturation-recovered light-field image to generate a demosaiced, demodulated, saturation-recovered light-field image. Demosaicing may be applied as described previously in this application. Additionally or alternatively, any of a variety of demosaicing methods known in the art may be applied to the demodulated, saturation-recovered light-field image. Such methods may include methods for converting a RAW image, such as an image in Bayer pattern form, to a form more commonly used in computing devices, such as JPEG, TIFF, or the like.

In a step 2298, the demosaiced, demodulated, saturation-recovered light-field image may be displayed for a user. This may be done on a display screen, such as the display screen 816 of FIG. 16B. Prior to performance of the step 2298, any additional steps needed to convert the demosaiced, demodulated, saturation-recovered light-field image to a form suitable for display may be used. Such steps may include various projection and/or rendering techniques, as known in the art and/or taught by the documents incorporated by reference herein. After completion of the step 2298, the method may end 2299.

The method of FIG. 22 is only one of many possible methods that may be used to recover saturated light-field pixels. According to various alternatives, demosaicing may be carried out at different stages. For example, in alternative embodiments, the demosaicing process may be applied to the light-field image directly after the light-field image is captured in the step 2210. In other embodiments, the demosaicing process may be applied to the demodulated light-field image after demodulation in step 2220, but prior to saturated pixel recovery. Yet further, demosaicing may be applied in the midst of method steps that implement saturated pixel recovery.

Other steps besides those shown in FIG. 22 may be added in alternative embodiments. For example, color space conversion, blurring, Automatic White Balance (AWB) algorithms and/or any other image processing steps set forth above may be incorporated into the method of FIG. 22, at any stage of the method.

The method may help reduce and/or eliminate saturation-induced artifacts from the final image viewed by the user. Thus, the method may provide for a scene that appears, to the user, to be a more to be a more realistic approximation of the subject matter captured in the light-field image.

Sample Light-Field Images

Figure 23A:
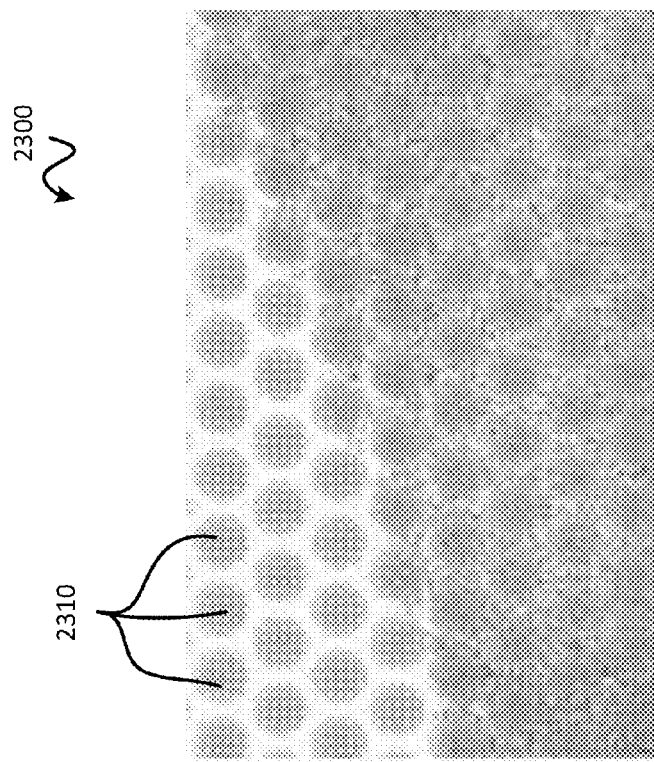
FIGS. 23A and 23B are saturated light-field images before and after saturation recovery, respectively.
Figure 23B:
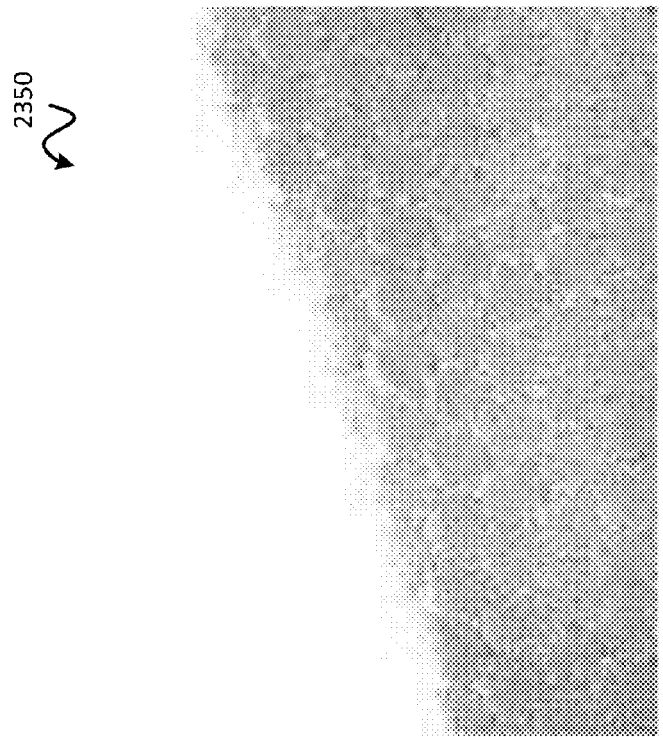

FIGS. 23A and 23B are saturated light-field images, or more specifically, a saturated light-field image 2300 and a saturation-recovered light-field image 2350. In the saturated light-field image 2300, distinct artifacts 2310 are visible as clusters of artificially darkened pixels. These artificially darkened pixels may be grouped in generally circular shapes, each of which corresponds to one of the microlenses of the microlens array 802. The saturated light-field image 2300 and a saturation-recovered light-field image 2350 may both be light-field images shown prior to the application of the demosaicing process, and may thus still be in RAW form. Thus, the artifacts 2310 may each have bright pixels of a color (for example, red, green, or blue if a Bayer pattern is used in the RAW image) for which saturation is limited, and dark pixels of colors for which saturation is more severe.

FIG. 23B illustrates the saturation-recovered light-field image 2350, which includes the same portion illustrated in the saturated light-field image 2300 of FIG. 23A, after application of at least the saturation recovery method of FIG. 22. For example, FIG. 23B may represent the result of application of the step 2230, the step 2240, the step 2250, the query 2260, the step 2270, the query 2280, and the step 2290 to the saturated light-field image 2300 of FIG. 23A.

As shown, the artifacts 2310 of the saturated light-field image 2300 are not present. Rather, the artificially darkened pixels of the saturated light-field image 2300 have been brightened to match the (more accurate) values of the surrounding pixels. In addition to removal of the artifacts 2310 from the upper left-hand portion of the saturated light-field image 2300, some of the pixels of the lower right-hand portion have also been brightened. These may be pixels that were also saturated in the saturated light-field image 2300 of FIG. 23A, but such saturation was not as clearly visible because it applied only to one or two colors of the Bayer pattern of the saturated light-field image 2300.

As mentioned in the description of FIG. 22, the method of FIG. 22 may optionally be applied prior to demosaicing; in such an event, only reference pixels of the same color as the corresponding saturated pixel may be used. Such processing may lead to more accurate saturation recovery, particularly for portions of a light-field image that are saturated with respect to one or two colors, but not all colors present in the RAW image format.

In any case, the saturation-recovered light-field image 2350 of FIG. 23B may display objects within the scene more distinctly and/or accurately as a result of application of the saturation recovery methods disclosed herein. Hence, images taken in bright environments may be more accurately rendered.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. In a light-field image capture device having a sensor and a plurality of microlenses, a method for compensating for sensor saturation and microlens modulation, the method comprising:
   in a processor, receiving a light-field image;
   in the processor, generating a demodulated light-field image based on the light-field image;
   in the processor, obtaining a first recovered value for a first saturated pixel of the demodulated light-field image, comprising:
      determining that at least a first reference pixel proximate the first saturated pixel comprises a first reference value higher than a first saturated value of the first saturated pixel; and
      based on the determination, establishing a first recovered value for the first saturated pixel, wherein the first recovered value is higher than the first saturated value;
   in the processor, generating a demodulated, saturation-recovered light field image in which the first saturated pixel has the first recovered value; and
   on a display device, displaying the demodulated, saturation-recovered light-field image.

2. The method of claim 1, wherein generating the demodulated light-field image comprises:
   in the processor, determining a flat-field response contour for each of at least one region of an image sensor;
   in the processor, generating a modulation image based on the at least one flat-field response contour; and
   in the processor, generating a demodulation image from the modulation image.

3. The method of claim 1, further comprising, prior to generation of the demodulated light-field image, identifying the first saturated pixel by determining that a pre-demodulation value of the saturated pixel value is equal to a maximum value that can be captured the sensor.

4. The method of claim 1, wherein the light-field image comprises a RAW light-field image comprising a plurality of pixels, each pixel being associated with a plurality of values, each value corresponding to a different spectral range, the method comprising:

applying a demosaicing operation to a selection from the group consisting of the light-field image, the demodulated light-field image, and the saturation-recovered light-field image.

5. The method of claim 4, wherein applying the demosaicing operation comprises applying the demosaicing operation on the saturation-recovered light-field image.

6. The method of claim 4, wherein applying the demosaicing operation comprises applying the demosaicing operation prior to obtaining the first recovered value.

7. The method of claim 4, wherein the plurality of pixels are arranged in a Bayer pattern.

8. The method of claim 1, wherein obtaining the first recovered value for the first saturated pixel of the demodulated light-field image further comprises, prior to determining that the first reference value is higher than the first saturated value:

iteratively comparing an intermediate saturated value of the first saturated pixel with an intermediate reference value of the first reference pixel; and in each iteration in which the intermediate reference value is greater than the intermediate saturated value, establishing the intermediate reference value as a new intermediate saturated value of the saturated pixel until the new intermediate saturated value is the first saturated value.

9. The method of claim 1, wherein obtaining the first recovered value for the first saturated pixel of the demodulated light-field image further comprises:

calculating an average reference value of a plurality of pixels proximate the first saturated pixel;

wherein determining that at least one additional reference pixel proximate the first saturated pixel comprises at least one additional reference value higher than the first saturated value comprises determining that the average reference value is higher than the first saturated value; and wherein establishing the first recovered value comprises setting the first recovered value equal to the average reference value.

10. The method of claim 9, wherein computing the average reference value of the plurality of pixels proximate the first saturated pixel comprises computing the average reference value of four pixels that are displaced from the first saturated pixel along four directions that are generally orthogonal to each other.

11. The method of claim 1, wherein the first saturated pixel is located in a first saturated pixel region of the demodulated light-field image, wherein the first saturated pixel region comprises, in addition to the first saturated pixel, a plurality of additional saturated pixels, the method further comprising:

obtaining an additional recovered value for each pixel of the plurality of additional saturated pixels;

wherein, in the saturation-recovered light-field image, each of the additional saturated pixels has the corresponding additional recovered value.

12. The method of claim 11, wherein the demodulated light-field image further comprises, in addition to the first saturated pixel region, a plurality of additional saturated pixel regions, wherein each of the first saturated pixel region and the additional saturated pixel regions comprises light-field data received through a microlens of the plurality of microlenses;

wherein generating the demodulated light-field image comprises, for each of the first saturated pixel region and the additional saturated pixel regions, creating a region of artificially low pixel values within the demodulated light-field image.

13. The method of claim 1, wherein receiving the light-field image comprises capturing the light-field image with the light-field image capture device.

14. A computer program product for compensating for sensor saturation and microlens modulation in a light-field image capture device having a sensor and a plurality of microlenses, the computer program product comprising:

a non-transitory storage medium; and computer program code, encoded on the medium, configured to cause at least one processor to perform the steps of:

receiving a light-field image;

generating a demodulated light-field image based on the light-field image;

obtaining a first recovered value for a first saturated pixel of the demodulated light-field image, comprising:

determining that at least a first reference pixel proximate the first saturated pixel comprises a first reference value higher than a first saturated value of the first saturated pixel; and based on the determination, establishing a first recovered value for the first saturated pixel, wherein the first recovered value is higher than the first saturated value;

generating a demodulated, saturation-recovered light field image in which the first saturated pixel has the first recovered value; and causing a display device to display the demodulated, saturation-recovered light-field image.

15. The computer program product of claim 14, wherein the computer program code configured to cause the at least one processor to generate the demodulated light-field image comprises computer program code configured to cause the at least one processor to perform the steps of:

determining a flat-field response contour for each of at least one region of an image sensor;

generating a modulation image based on the at least one flat-field response contour; and generating a demodulation image from the modulation image.

16. The computer program product of claim 14, wherein the light-field image comprises a RAW light-field image comprising a plurality of pixels, each pixel being associated with a plurality of values, each value corresponding to a different spectral range, wherein the computer program code is further configured to cause the at least one processor to perform the step of:

applying a demosaicing operation to a selection from the group consisting of the light-field image, the demodulated light-field image, and the saturation-recovered light-field image.

17. The computer program product of claim 14, wherein the computer program code configured to cause the at least one processor to obtain the first recovered value for the first saturated pixel of the demodulated light-field image is configured to cause the at least one processor, prior to determining that the first reference value is higher than the first saturated value, to perform the steps of:

iteratively comparing an intermediate saturated value of the first saturated pixel with an intermediate reference value of the first reference pixel; and in each iteration in which the intermediate reference value is greater than the intermediate saturated value, establishing the intermediate reference value as a new intermediate saturated value of the saturated pixel until the new intermediate saturated value is the first saturated value.

18. The method of claim 14, wherein the computer program code configured to cause the at least one processor to obtain the first recovered value for the first saturated pixel of the demodulated light-field image comprises computer program code configured to cause the at least one processor to perform the step of:
calculating an average reference value of a plurality of pixels proximate the first saturated pixel;
wherein the computer program code configured to cause the at least one processor to determine that at least one additional reference pixel proximate the first saturated pixel comprises at least one additional reference value higher than the first saturated value comprises computer program code configured to cause the at least one processor to determine that the average reference value is higher than the first saturated value;
and wherein the computer program code configured to cause the at least one processor to establish the first recovered value comprises computer program code configured to cause the at least one processor to set the first recovered value equal to the average reference value.

19. The method of claim 14, wherein the first saturated pixel is located in a first saturated pixel region of the demodulated light-field image, wherein the first saturated pixel region comprises, in addition to the first saturated pixel, a plurality of additional saturated pixels, wherein the computer program code is further configured to cause the at least one processor to perform the step of:
obtaining an additional recovered value for each pixel of the plurality of additional saturated pixels;
wherein, in the saturation-recovered light-field image, each of the additional saturated pixels has the corresponding additional recovered value;
wherein the demodulated light-field image further comprises, in addition to the first saturated pixel region, a plurality of additional saturated pixel regions, wherein each of the first saturated pixel region and the additional saturated pixel regions comprises light-field data received through a microlens of the plurality of microlenses;
wherein the computer program code configured to cause the at least one processor to generate the demodulated light-field image comprises computer program code configured to cause the at least one processor, for each of the first saturated pixel region and the additional saturated pixel regions, to create a region of artificially low pixel values within the demodulated light-field image.

20. A system for compensating for sensor saturation and microlens modulation in a light-field image capture device having a sensor and a plurality of microlenses, the system comprising:
a processor, configured to:
receive a light-field image;
generate a demodulated light-field image based on the light-field image;
obtain a first recovered value for a first saturated pixel of the demodulated light-field image, comprising:
determine that at least a first reference pixel proximate the first saturated pixel comprises a first reference value higher than a first saturated value of the first saturated pixel; and
based on the determination, establish a first recovered value for the first saturated pixel, wherein the first recovered value is higher than the first saturated value; and
generate a demodulated, saturation-recovered light field image in which the first saturated pixel has the first recovered value; and
a display device, communicatively coupled to the processor, configured to:
display the demodulated, saturation-recovered light-field image.

21. The system of claim 20, wherein the processor is configured to generate the demodulated light-field image by:
determining a flat-field response contour for each of at least one region of an image sensor;
generating a modulation image based on the at least one flat-field response contour; and
generating a demodulation image from the modulation image.

22. The system of claim 20, wherein the light-field image comprises a RAW light-field image comprising a plurality of pixels, each pixel being associated with a plurality of values, each value corresponding to a different spectral range, wherein the processor is further configured to:
apply a demosaicing operation to a selection from the group consisting of the light-field image, the demodulated light-field image, and the saturation-recovered light-field image.

23. The system of claim 20, wherein the processor is configured to obtain the first recovered value for the first saturated pixel of the demodulated light-field image by, prior to determining that the first reference value is higher than the first saturated value:
iteratively comparing an intermediate saturated value of the first saturated pixel with an intermediate reference value of the first reference pixel; and
in each iteration in which the intermediate reference value is greater than the intermediate saturated value, establishing the intermediate reference value as a new intermediate saturated value of the saturated pixel until the new intermediate saturated value is the first saturated value.

24. The system of claim 20, wherein the processor is configured to obtain the first recovered value for the first saturated pixel of the demodulated light-field image by:
calculating an average reference value of a plurality of pixels proximate the first saturated pixel;
wherein the processor is configured to determine that at least one additional reference pixel proximate the first saturated pixel comprises at least one additional reference value higher than the first saturated value by determining that the average reference value is higher than the first saturated value;
and wherein the processor is configured to establish the first recovered value by setting the first recovered value equal to the average reference value.

25. The method of claim 20, wherein the first saturated pixel is located in a first saturated pixel region of the demodulated light-field image, wherein the first saturated pixel region comprises, in addition to the first saturated pixel, a plurality of additional saturated pixels, wherein the processor is further configured to:
obtain an additional recovered value for each pixel of the plurality of additional saturated pixels;

wherein, in the saturation-recovered light-field image, each of the additional saturated pixels has the corresponding additional recovered value;

wherein the demodulated light-field image further comprises, in addition to the first saturated pixel region, a plurality of additional saturated pixel regions, wherein each of the first saturated pixel region and the additional saturated pixel regions comprises light-field data received through a microlens of the plurality of microlenses;

wherein the processor is configured to generate the demodulated light-field image by, for each of the first saturated pixel region and the additional saturated pixel regions, creating a region of artificially low pixel values within the demodulated light-field image.

* * * * *